(12) United States Patent
Horikiri

(10) Patent No.: US 6,339,783 B1
(45) Date of Patent: Jan. 15, 2002

(54) PROCEDURE EXECUTION DEVICE AND PROCEDURE EXECUTION METHOD

(75) Inventor: Kazunori Horikiri, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 08/986,731

(22) Filed: Dec. 8, 1997

(30) Foreign Application Priority Data

Dec. 10, 1996 (JP) .............................................. 8-330030

(51) Int. Cl.[7] .............................................. G06F 15/16
(52) U.S. Cl. ........................ 709/203; 709/311; 709/315; 709/330; 707/3; 717/2
(58) Field of Search ................................ 709/201, 202, 709/203, 217, 230, 231, 310, 311, 314, 315, 316, 328, 329, 330, 331, 332; 717/4, 2; 707/3, 4, 5, 101, 100

(56) References Cited

U.S. PATENT DOCUMENTS

| | | | | |
|---|---|---|---|---|
| 4,525,780 A | * | 6/1985 | Bratt et al. ................... | 364/200 |
| 5,287,444 A | * | 2/1994 | Enescu et al. ............... | 707/507 |
| 5,469,574 A | * | 11/1995 | Chang et al. .................. | 717/2 |
| 5,544,316 A | * | 8/1996 | Carpenter et al. ........... | 709/310 |
| 5,748,881 A | * | 5/1998 | Lewis et al. .................. | 714/47 |
| 5,754,175 A | * | 5/1998 | Koppolu et al. ............. | 345/335 |
| 5,765,152 A | * | 6/1998 | Erickson ........................ | 707/9 |
| 5,793,966 A | * | 8/1998 | Amstein et al. ............. | 709/203 |
| 5,826,064 A | * | 10/1998 | Loring et al. ................. | 793/24 |
| 5,826,077 A | * | 10/1998 | Blakeley et al. ............. | 707/4 |
| 5,872,973 A | * | 2/1999 | Mitchell et al. ............. | 395/685 |
| 5,875,332 A | * | 2/1999 | Wang et al. .................. | 717/2 |
| 5,887,172 A | * | 3/1999 | Vasudevan et al. .......... | 709/328 |
| 5,903,725 A | * | 5/1999 | Colyer ........................ | 709/203 |
| 6,049,838 A | * | 4/2000 | Miller et al. ................. | 709/303 |

OTHER PUBLICATIONS

O. Rees et al., "A Web Of Distributed Objects", The ANSA Project, Architecture Projects Management, Ltd. (1995).
Common Gateway Interface.
OpenDoc for Macintosh; An Overview for Developers, Apple Computer, Inc. pp. 1–8 (1994).
K. Brockschmidt et al., "OLE Integration Technologies: A Technical Overview", Microsoft, pp. 1–11 (1997).

* cited by examiner

Primary Examiner—Le Hien Luu
Assistant Examiner—William C. Vaughn, Jr.
(74) Attorney, Agent, or Firm—Oliff & Berridge, PLC

(57) ABSTRACT

The objective of this invention is to allow the user to invoke a composite remote procedure by connecting remote procedures that are managed on networks in distribution with each other, or define a new remote procedure.

A remote procedure client receives a procedure definition hypertext from a remote procedure server, references procedure specifications of predefined remote procedures if necessary, and defines a new remote procedure by combining the predefined procedures. The procedure definition is sent with a procedure definition request to the remote procedure server and is stored. When the defined new procedure is invoked, a procedure execution unit executes the procedure under the control of a remote procedure manager. When an argument of the procedure is a hyperlink, the procedure execution unit executes at first a procedure pointed by the hypelink, and then restarts the original procedure. When the procedure pointed by the hyperlink is a composite procedure, the procedure is executed after the composite procedure is expanded by referencing procedure definitions.

3 Claims, 5 Drawing Sheets

Fig. 1 CONFIGURATION OF THE FIRST EMBODIMENT

Fig. 4
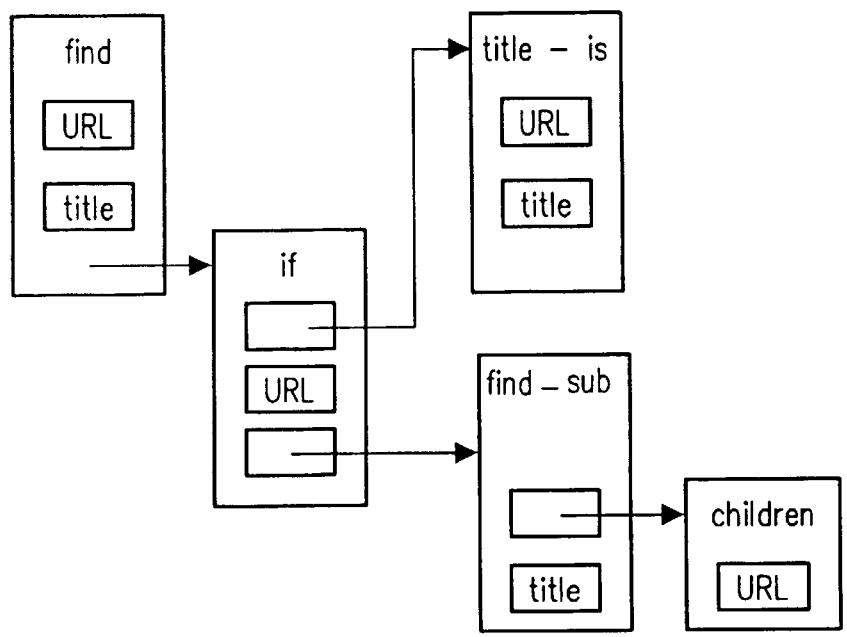
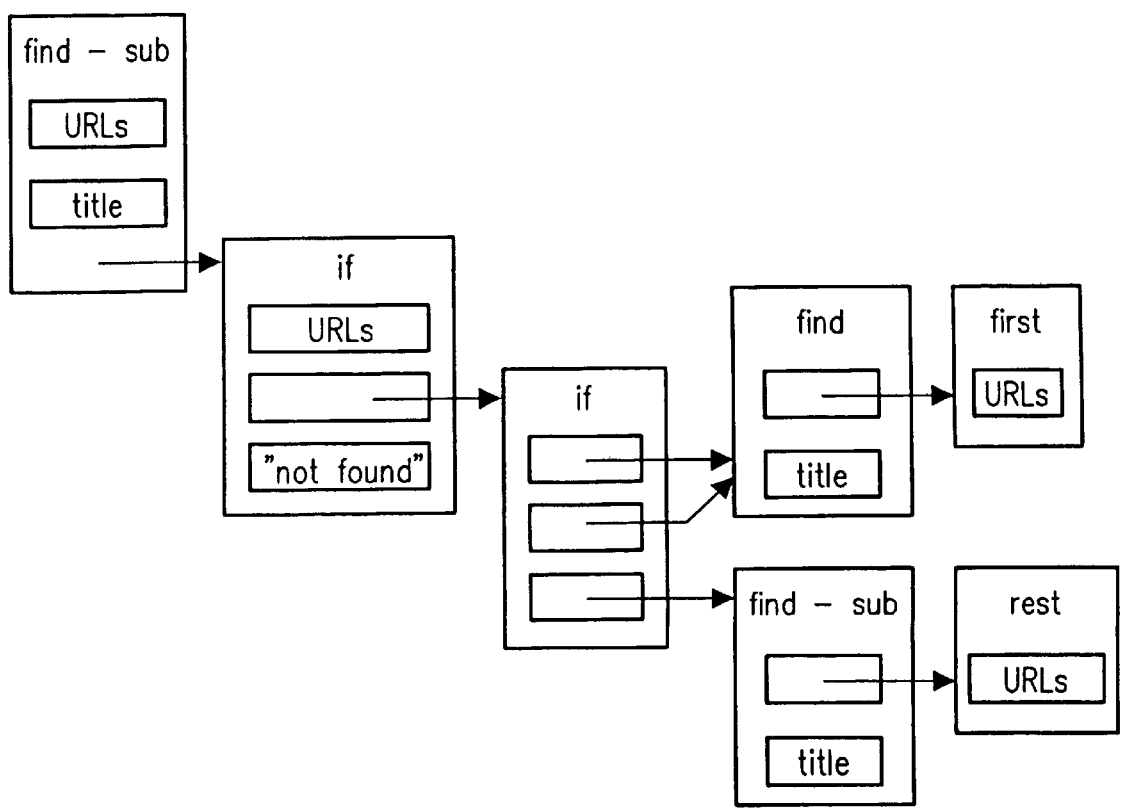

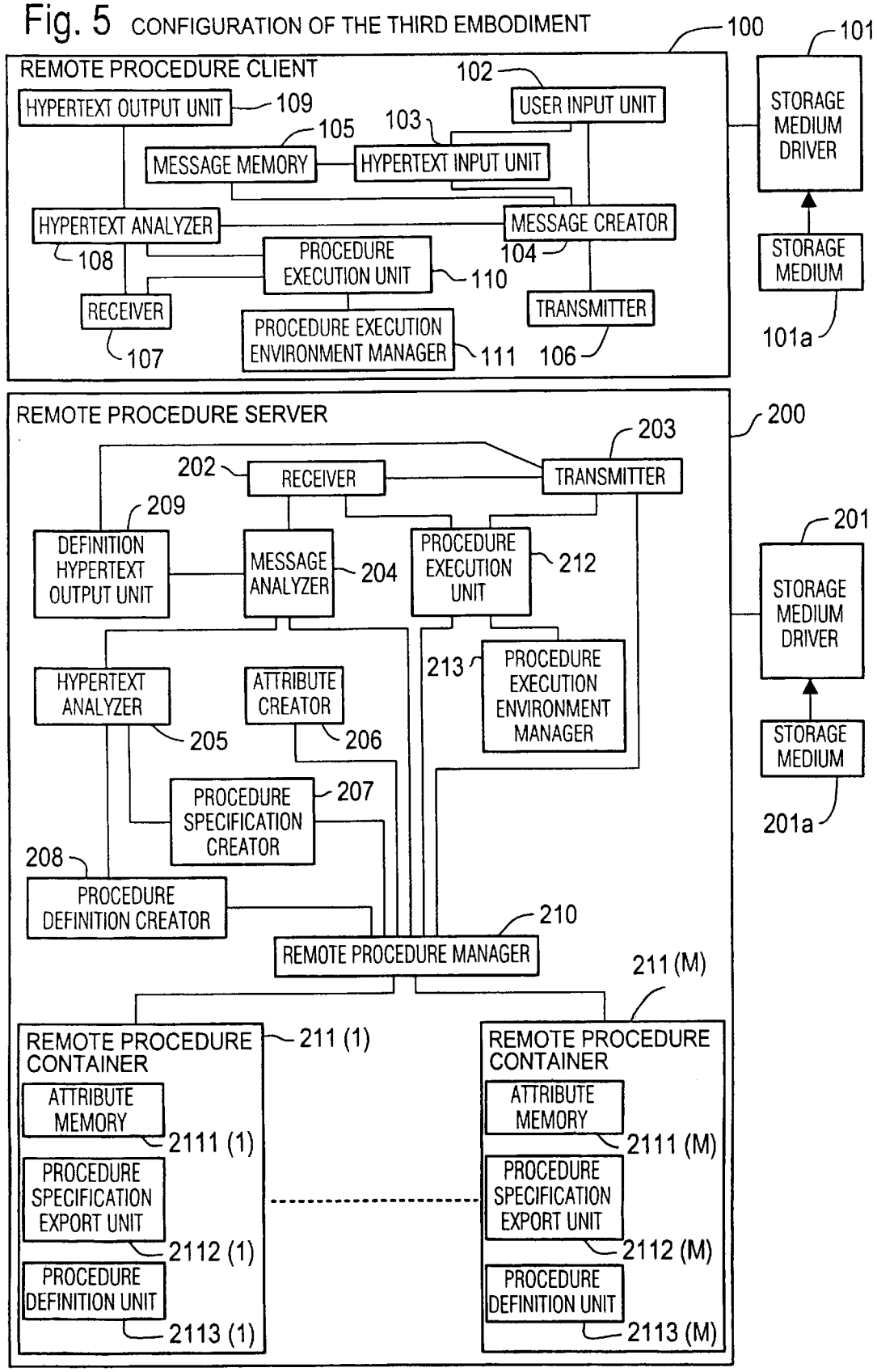
Fig. 5 CONFIGURATION OF THE THIRD EMBODIMENT

PROCEDURE EXECUTION DEVICE AND PROCEDURE EXECUTION METHOD

BACKGROUND OF THE INVENTION

1. Field of the Invention

This invention relates to a device and method that manage and execute remote procedures on the network information system that connects plural computer systems executing information processing with each other. In particular, this invention makes it possible to combine remote procedures that are located on plural computer system in distribution and executes them.

2. Description of Related Art

Recently, computer systems are used under distributed environment in many cases, and the procedures executed on the computer systems are stored and managed in distribution. Under the distributed environment, the user can invoke a procedure located on a remote computer system. However, the remote user cannot combine plural procedures managed by the computer systems and execute them at will. Under the distributed environment, it is desired that all procedures are located in distribution and these distributed procedures are combined with each other and are executed easily and effectively.

There are conventional arts related to this invention shown as follows.

Common Gateway Interface (CGI) is a standard that defines environment variables, command lines, standard input and standard output between an application program and an information server that invokes the application program so that the information server, such as a hypertext transfer protocol (HTTP) server, creates information dynamically.

However, CGI does not provide any mechanism that allows an application program to invoke a service including a remote procedure provided by another information server, such as a HTTP server.

Accordingly, it has not been possible to at will combine and use application programs invoked by an information server such as a HTTP server through an information client such as a World Wide Web (WWW) client.

Japanese Laid-Open Publication Number 6-75892 discloses a remote procedure management device. This invention comprises a remote procedure request unit, a system remote procedure execution unit, a system remote procedure manager and a system procedure preprocessor. The remote procedure request unit requests a remote procedure for the service provided by the system. The system remote procedure execution unit executes a remote procedure for the service provided by the system. The system remote procedure manager manages remote procedures by linking the system remote procedure execution unit with plural remote procedures for services provided by the system based on a remote procedure identifier that is unique within the network system. The system procedure preprocessor is invoked by a stub, which executes a remote procedure call, queries the system remote procedure manager, determines the system's remote procedure to be invoked and invokes the corresponding system remote procedure execution unit. This configuration allows a remote procedure provided by a system to be called even if the remote procedure on the system is not defined in the interface of the application service.

ANSA Information Services Framework from Architecture Projects Management Limited is a distributed system based on Common Object Request Broker Architecture (CORBA) and WWW (Rees, O., Edwards, N., Madsen, M., Beasley, M. and McClenaghan, A.: A Web of Distributed Object, The ANSA Project, Architecture Projects Management Ltd(1995)).

This system uses Internet Inter-ORB Protocol in order to transfer General Inter-ORB Protocol via IP (Internet) protocol.

This technology makes it possible to access CORBA objects from the WWW by preparing a gateway for converting HTTP to IIOP and a gateway for converting IIOP to HTTP.

Delegate is a multipurpose protocol mediation system developed by Yutaka Sato in Electrotechnical Laboratory. ("Delegate: Multipurpose Protocol Mediation System: DeleGate", Bulletin of the Electrotechnical Laboratory, Vol.59, No.6 (1995)).

DeleGate executes a protocol conversion, character code conversion, and MIME (Multipurpose Internet Mail Extension) code conversion at the time of mediation in order to provide a protocol, character code and MIME code which are suitable for the client. However, this technology does not allow the user to synthesize a desired remote procedure call by combining a plurality of DeleGate in a form of a network.

OpenDoc (trademark of Apple Co.) is a component software architecture technology provided by Apple Corporation. Basic elements that constitute Opendoc are shown in the following.

(1) document: a set of parts combined by the user or application developer.
(2) part: a structural element of a document.
(3) part editor: a user interface to display the content of a part, to operate the content or to change the content.
(4) part service: user interface to provide a function held by a part, or to operate the content of a part.
(5) part viewer: a display of the content of a part to the user.
(6) container application: an application that supports a part editor and a part service.

Opendoc is a document-oriented application building environment. In Opendoc, a document is made of plural parts, which are application modules. A document in Opendoc is made by inserting parts in the top level part. Each part accompanies a part editor that changes the state of part according to a display of the part or an event on the part.

As described above, Opendoc provides a mechanism that creates a compound document made of plural types of objects by combining parts, each of which is an independent application module. However, this technology neither exports an interface of a part under the distributed environment including Internet nor defines a new function by connecting parts in a form of a graph under the distributed environment.

OLE (Object Linking and Embedding) is a component ware based on compound document provided by Microsoft Corporation. OLE uses Component Object Model (COM) provided by Microsoft Corporation as a collaborative object environment. (OLE and COM are trademark of Microsoft Co.).

DCOM (Distributed Component Object Model, Trademark) is an application level protocol provided by Microsoft Corporation. The objective of DCOM is a remote procedure call among objects in a network distributed component system. DCOM was called Network OLE. DCOM is based on DCE-RPC of Open Software Foundation and can be used in cooperation with COM provided by Microsoft Corporation.

OLE can create an application by combining a variety of parts. OLE provides two methods to insert parts, that is, the embedding and the linking. Embedding is a method to insert a whole object into another object. Linking is a method which the body of an object outside a document referenced by an pointer in the document. However, OLE cannot create an application by designating a graph made of plural links. In other words, OLE can create a compound part having plural levels of hierarchy by iterating one level part composition that uses RPC between objects. However, OLE neither defines a pattern specifying plural level of composition at a time nor connects parts dynamically at the time of execution.

IntelligentPad is a compound media tool kit proposed by Professor Yuzuru Tanaka in Hokkaido University. IntelligentPad is a platform to create a document by combining plural pads, each of which is a media object having a metaphor of a paper.

A primitive pad provided by IntelligentPad system provides functions including input, output storing of data, geometry management of pads, data conversion, and extension of the function of a specific application and a system. The user can combines the pads on a screen so as to create a composite pad, which composes functions.

However, IntelligentPad neither exports the function of a pad on the distributed environment including Internet nor executes distributed computing by combining pads that exist in distributed environment.

As described above, by using the conventional arts, it is difficult for the user who uses remote procedure client application to define a desired service by combining plural remote procedure servers. Further, when a service is provided by combining remote procedure calls, it is difficult for the user who uses a client application to know variables assigned to each remote procedure and the execution result.

SUMMARY OF THE INVENTION

The present invention has been made in view of the above circumstances. An object of the present invention is to allow the user to invoke a composite procedure or to define a new remote procedure by combining interactively remote procedures managed in distribution on a network.

To achieve the object as embodied and broadly described herein, this invention provides a procedure execution device comprising: an input unit for inputting a first query to retrieve a program and a parameter that is necessary for executing the program; a message analyzer for separating the first query and the parameter inputted through the input unit; a storage for storing a second query and a slot to insert a parameter necessary for a program retrieved by using the second query, both the second query and the slot corresponding to the first query; a procedure retriever for retrieving the second query and the slot corresponding to the first query separated by the message analyzer; and a procedure controller for inputting the second query as the first query and for inputting the slot to which the parameter separated by the message analyzer is inserted as the parameter through the input unit.

This configuration makes it possible to store a second query related to a first query, and a slot for inserting a parameter of a program retrieved by using the second query into a storage such as a database, to synthesize the program retrieved by the first query by using the program retrieved by using the second query, and to execute the synthesized program.

The present invention further provides an information processing system including a plurality of computer systems that are connected with each other by a network and stores procedures, comprising: a storage for storing a composite procedure that is described so that an argument thereof includes location information on the network for a procedure; a call unit, when the composite procedure is executed with the location information for the procedure as an argument, for calling the procedure corresponding to the location information; a first execution unit for executing the called procedure and returning a result of the execution; and a second execution unit for receiving the result of the called procedure returned by the first execution unit and for continuing execution of the composite procedure.

This configuration allows the user to synthesize a composite procedure by assigning locations of plural procedures to arguments in order to combine them, and to execute the composite procedure by invoking the procedures located in the locations on the network specified by the assignments of the arguments.

BRIEF DESCRIPTION OF THE DRAWINGS

FIG. 4 shows a concept of the operations of the second embodiment.

FIG. 5 is a block diagram illustrating the configuration of the third embodiment of the present invention.

DETAILED DESCRIPTION OF THE PREFERRED EMBODIMENT

[First Embodiment]

In a first embodiment, a remote procedure is defined as a hypertext created by combining plural remote procedures whose interfaces are exported by using hypertexts. One or more servers manage the definitions of remote procedures and executes the remote procedures. This embodiment explains an example that defines a procedure calculating a factorial by combining a conditional branch procedure, a multiplication procedure and a decrement procedure, and executes the defined factorial procedure.

Figure 1:
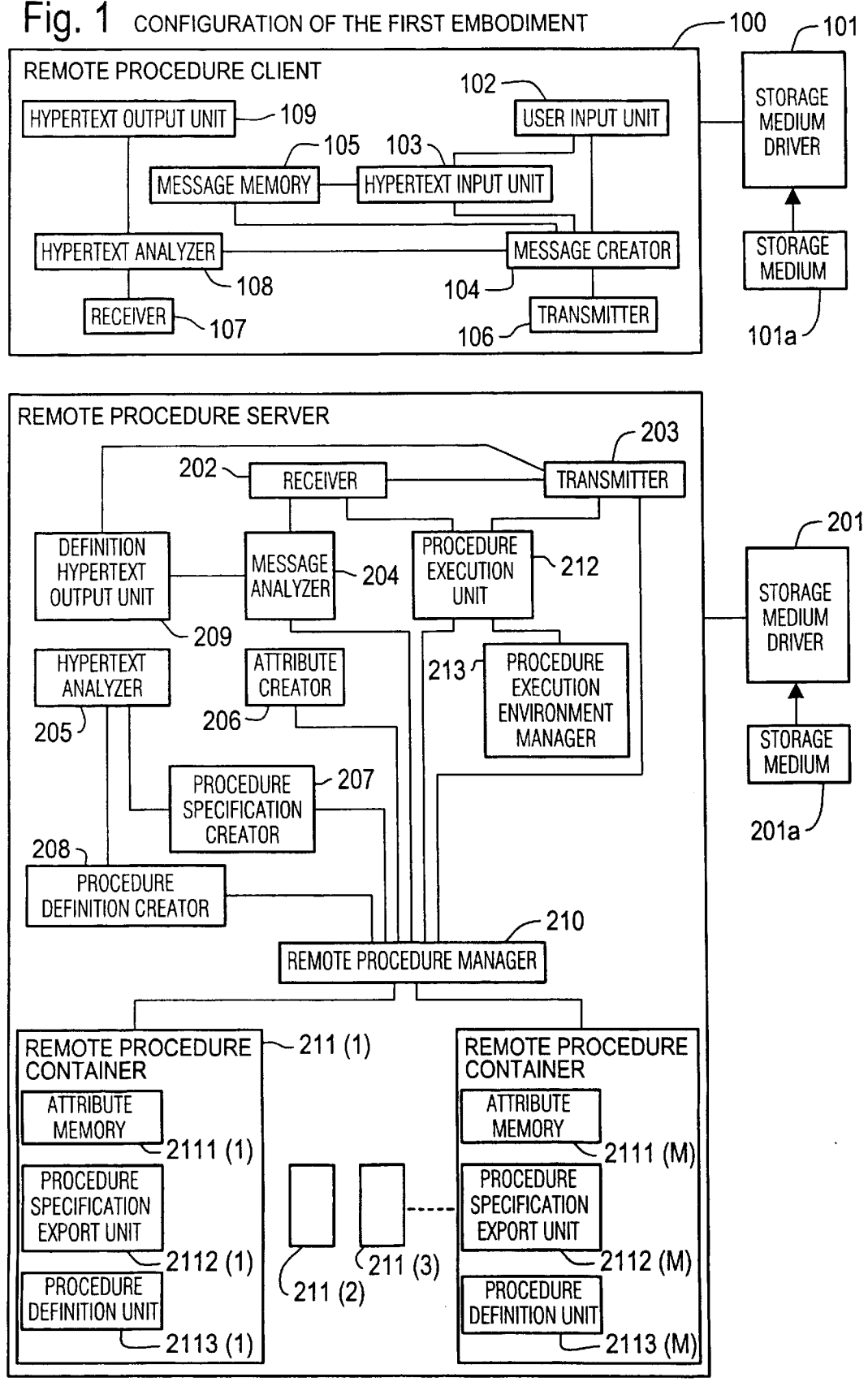
FIG. 1 is a block diagram illustrating the configuration of the first embodiment of the present invention.

FIG. 1 is a block diagram illustrating the configuration of the first embodiment. In FIG. 1, a remote procedure management device includes remote procedure client 100 and remote procedure server 200. Remote procedure client 100 and remote procedure server 200 are connected with each other via network that is not shown in this figure. Functions executed by remote procedure client 100 or remote procedure server 200 are implemented by software programs. The prescribed programs are stored in storage mediums 101a and 201a, and are installed beforehand in remote procedure client 100 and remote procedure server 200 through storage medium drivers 101 and 201. Generally, the remote procedure management device can includes one or more remote procedure clients 100 and one or more remote procedure servers 200.

In the following explanation, only one remote procedure server 200 stores plural definitions of procedures; however, those definitions of procedures and the procedures can be stored in plural remote procedure servers 200 and remote procedure clients 100 in distribution. Further, the remote user can creates a new procedure by combining them, and can make the created procedure execute from a remote client.

Remote procedure client 100 includes user input unit 102, hypertext input unit 103, message creator 104, message memory 105, transmitter 106, receiver 107, hypertext analyzer 108 and hypertext output unit 109.

User input unit 102 receives an input that the user input by using a keyboard, pointing device or the like, outputs a message creation request to message creator 104, and outputs an input request to hypertext input unit 103 in response to the user's input. Hypertext input unit 103 receives a hypertext and outputs it to message creator 104 in response to the input request from user input unit 102. Hypertext input unit 103 also requests of message memory 105 to output a second message and includes the output second message as a part of the hypertext in response to the input request from user input unit 102.

Message creator 104 creates a message for remote procedure server 200 in response to the message creation request from user input unit 102, and outputs the created message to transmitter 106 and message memory 105. Message memory 105 gives a number to the input message, and manages messages by using a list that is made of elements each is a pair of the message and the given number. Massage memory 105 receives a message output request that specifies a number, retrieves the message corresponding to the number in the request from the list, and outputs the retrieved message to hypertext input unit 103.

Transmitter 106 sends the message coming from message creator 104 to remote receiver 202.

Receiver 107 receives a hypertext that is a reply from remote transmitter 203, and outputs the received hypertext to hypertext analyzer 108. Hypertext analyzer 108 analyzes the hypertext coming from receiver 107, requests hypertext output unit 109 to show the hypertext to the user, and outputs a message creation information to message creator 104. The message creation information is a information of the message to be created in accordance with the message creation request from message input 102.

Hypertext output unit 109 shows a hypertext in the form of characters, images or audio data in accordance with the requests coming from the hypertext analyzer 108 and user input unit 102.

Remote procedure server 200 includes receiver 202, transmitter 203, message analyzer 204, hypertext analyzer 205, attribute creator 206, procedure specification creator 207, procedure definition creator 208, definition hypertext output unit 209, remote procedure manager 210, remote procedure containers 211(1) through 211(M), procedure execution unit 212 and procedure execution environment manager 213. "M" in the reference numeral 211(M) means an arbitrary natural number. The reference numeral 211 sometimes represents the remote procedure containers 211(1) through 211(M). In the following explanation, the reference numerals 2111, 2112 and 2113 may be also used with the suffix (1) through (m) in the same way. Each remote procedure container 211 includes attribute memory 2111, procedure specification export unit 2112 and procedure definition unit 2113.

Receiver 202 receives a message coming from remote transmitter 106 and outputs the received message to message analyzer 204. Also, receiver 202 receives the result of a procedure execution from remote transmitter 106 and outputs procedure execution unit 212. Transmitter 203 sends the result of a procedure execution and a message to remote receiver 107.

Message analyzer 204 analyzes a message coming from receiver 202 and classifies it into "procedure call message", "procedure specification export request message", "procedure definition request message" and "procedure definition hypertext output request message".

When the message is a procedure call message, message analyzer 204 extracts a parameter from the message and outputs it to remote procedure manager 210. When the message is a procedure definition request message, message analyzer 204 extracts a hypertext from the message and outputs it to hypertext analyzer 205.

When remote procedure manager 210 receives a parameter from message analyzer 204, it retrieves remote procedure container 211 that matches the query included in the parameter. Further, remote procedure manager 210 outputs a procedure definition stored in procedure definition unit 2113 of the retrieved procedure container 211 and the parameter to procedure execution unit 212 in order to make a request for the execution of the procedure.

When remote procedure manager 210 receives procedure definition and procedure specification from procedure definition creator 208 and procedure specification creator 207, respectively, it creates a new remote procedure container 211 and stores the procedure definition and the procedure specification into new procedure definition unit 2113 and procedure specification export unit 2112, respectively. Attribute memory 2111 stores a list of attributes, each is a pair of an attribute name and an attribute value. In this embodiment, attribute "name", which identifies the remote procedure container 211, is stored. Generally, attribute memory 2111 can store at least one pair of an attribute name and an attribute value. The remote procedure container 211 should be identified by designating at least one attribute.

Procedure specification export unit 2112 stores a specification that includes the following elements: a description regarding arguments of a procedure in the form of a formal language, a description regarding arguments of a procedure in the form of a natural language, a description regarding return from a procedure in the form of a formal language, a description regarding return from a procedure in the form of a natural language, and procedure call expression creation data for creating a procedure call expression. When procedure specification export unit 2112 receives a procedure specification export request, it outputs the specification in the form of a hypertext. Generally, procedure specification export unit 2112 can store any partial set that includes at least one element of the specification described above.

For example, the following is a hypertext of a procedure specification based on HTML. This hypertext shows that the procedure requires two arguments "v1" and "v2" that requests to be assigned and the query of remote procedure container 211 is "/times".

(1)
<HEAD>
<TITLE> Page for multiplication </TITLE>
</HEAD>
<H1>Page for multiplication </H1>
A page for multiplying given arguments <P>
<HR>
<FORM METHOD="GET" ACTION="/times">
First Argument: <INPUT NAME="v1" TYPE="entry"><P>
Second Argument: <INPUT NAME="v1" TYPE="entry"><P>
<INPUT TYPE="submit" VALUE="Start Function">
</FORM>

Procedure execution unit 212 executes a procedure according to a list of arguments input by message analyzer 204. During the execution of the procedure, when the other procedure container 211 is requested to execute a procedure, a message is sent through message analyzer 204.

Next, an example that defines and executes a factorial procedure is explained in detail. The factorial procedure is defined by combining a conditional branch procedure, multiplication procedure and decrement procedure. At the beginning, it is explained what procedures are contained. Here, all procedure definition units 2113 are supposed to have arguments "v1", "v2", "v3", and the like, for convenience of explanation, unless otherwise provided. We use the notation of a message as "http://host2/fname?v1=a1&v2=a2". It means that remote procedure container 211 that includes attribute memory 2111 in which the attribute value of attribute "name" is "fname" has arguments "v1" and "v2". The message also means that values "a1" and "a2" are assigned to arguments "v1" and "v2", respectively.

Procedure definition creator 208 receives a new procedure definition expression (for example, a factorial procedure definition expression) and creates remote procedure definition unit. More in detail, procedure definition creator 208 stores a procedure definition expression inputted by hypertext analyzer 205 and creates a procedure definition unit that executes the following list transformation algorithm.

(1) If the input expression is a list,
  (a) Assign the head element of the list to "car".
  (b) If the list consists of only the head element, return "car".
  Otherwise, go to next step.
  (c) For each k-th element of the list (k=2, . . . , last element), replace the right side of "=" with the result obtained by applying this algorithm to the right side of "=" and escaping special characters.
  (d) Return "car?second&third". Here, "second" and "third" mean the second and third elements of the list, respectively.
(2) If the input expression is a variable, return the value assigned to the variable to procedure execution environment manager 213.
(3) If the input expression is neither a variable nor a list, return the input expression.

Next, procedures that are used for synthesizing the factorial procedure are explained. The procedures are: a conditional branch procedure, a multiplication procedure and a decrement procedure. At the beginning, remote procedure container 211(1) that contains data regarding the conditional branch procedure is explained.

Attribute memory 2111(1) of remote procedure container 211(1) stores attribute name "name" and its attribute value "if".

Procedure specification export unit 2112(1) stores the following.

(2)
  <HEAD>
  <TITLE> Page for conditional branch </TITLE>
  </HEAD>
  <H1> Page for conditional branch </H1>
  A page for fork of execution according to the condition of the given conditional parameter<P>
  <HR>
  <FORM METHOD="get" ACTION="http://host2/if">condition: <INPUT NAME="v1" TYPE="entry"><P>
  satisfied: <INPUT NAME="v2" TYPE="entry"><P>
  unsatisfied: <INPUT NAME="v3" TYPE="entry"><P>
  <INPUT TYPE="submit" VALUE="Start Function">
  </FORM>

Procedure definition unit 2113(1) stores a procedure definition by which procedure execution unit 212 executes the procedure according to the following conditional branch algorithm.

[Step 1] A first assignment to argument "v1" is examined. If the first assignment is a string indicating decimal integer, the string is transformed into an integer and the integer is assigned as a second assignment to "v1". Then, the control goes to step 4. If the first assignment to argument "v1" is a second message including a hyperlink, the second message is inputted to transmitter 203, and the control goes to the next step.

[Step 2] Transmitter 203 outputs the message to receiver 202 corresponding to the hyperlink, and outputs a reply that comings from the receiver 202 as a result to procedure execution unit 212.

[Step 3] Procedure execution unit 212 analyzes the reply and gets a second assignment to "v1".

[Step 4] The control goes to step 9, if the second assignment to argument "v1" is integer "0". Otherwise, the control goes to step 5.

[Step 5] A first assignment to argument "v2" is examined. If the first assignment is a string indicating a decimal integer, the string is transformed into an integer and the integer is assigned as a second assignment to "v2". Then, the control goes to step 8. If the first assignment to argument "v2" is a third message including a hyperlink, the third message is inputted to transmitter 203, and the control goes to the next step.

[Step 6] Transmitter 203 outputs the third message to receiver 202 corresponding to the hyperlink, and outputs a reply that comings from the receiver 202 as a result to procedure execution unit 212.

[Step 7] Procedure execution unit 212 analyzes the reply and gets a second assignment to "v2".

[Step 8] A hypertext including the second assignment to "v2" as a result is created, and the created hypertext is outputted to transmitter 203. Then, the operation stops.

[Step 9] A first assignment to argument "v3" is examined. If the first assignment is a string indicating a decimal integer, the string is transformed into an integer and the integer is assigned as a second assignment to "v3". Then, the control goes to step 12. If the first assignment to argument "v3" is a fourth message including a hyperlink, the fourth message is input to transmitter 203.

[Step 10] Transmitter 203 outputs the fourth message to receiver 202 corresponding to the hyperlink, and outputs a reply that comings from the receiver 202 as a result to procedure execution unit 212.

[Step 11] Procedure execution unit 212 analyzes the reply and gets a second assignment to "v3".

[Step 12] A hypertext including the second assignment to "v3" as a result is created, and the created hypertext is output to transmitter 203. Then, the operation stops.

Next, remote procedure container 211(2) that stores data regarding a multiplication procedure is explained. Attribute memory 2111(2) of remote procedure container 211(2) stores an attribute in which the value of attribute name "name" is "times". Procedure definition unit 2113(2) stores a procedure definition by which procedure execution unit 212 executes the procedure according to the following multiplication algorithm. Procedure specification export unit 2112(2) has already been explained.

[Step 1] A first assignment to argument "v1" is examined. If the first assignment is a string indicating a decimal integer, the string is transformed into an integer and the integer is assigned as a second assignment to "v1". Then, the control goes to step 4. If the first assignment to argument "v1" is a second message including a hyperlink, the second message is input to transmitter 203, and the control goes to the next step.

[Step 2] Transmitter 203 outputs a message to receiver 202 corresponding to the hyperlink, and outputs a reply that comings from the receiver 202 as a result to procedure execution unit 212.

[Step 3] Procedure execution unit 212 analyzes the reply and gets a second assignment to "v1".

[Step 4] A first assignment to argument "v2" is examined. If the first assignment is a string indicating a decimal integer, the string is transformed into an integer and the integer is assigned as a second assignment to "v2". Then, the control goes to step 7. If the first assignment to argument "v2" is a third message including a hyperlink, the third message is input to transmitter 203.

[Step 5] Transmitter 203 outputs the third message to receiver 202 corresponding to the hyperlink, and outputs a reply that comings from the receiver 202 as a result to procedure execution unit 212.

[Step 6] Procedure execution unit 212 analyzes the reply and gets a second assignment to "v2".

[Step 7] A hypertext including the value obtained by multiplying the second assignment to "v2" and the second assignment to "v3" as a result is created, and the hypertext is output to transmitter 203. Then, the operation stops.

Next, remote procedure container 211(3) that stores data regarding a decrement procedure is explained. Attribute memory 2111(3) of remote procedure container 211(3) stores an attribute in which the value of attribute name "name" is "dec". Procedure definition unit 2113(3) stores a procedure definition by which procedure execution unit 212 executes the procedure according to the following decrement algorithm.

[Step 1] A first assignment to argument "v1" is examined. If the first assignment is a string indicating a decimal integer, the string is transformed into an integer and the integer is assigned as a second assignment to "v1". Then, the control goes to step 4. If the first assignment to argument "v1" is a second message including a hyperlink, the second message is input to transmitter 203, and the control goes to the next step.

[Step 2] Transmitter 203 outputs a message to receiver 202 corresponding to the hyperlink, and outputs a reply that comings from the receiver 202 as a result to procedure execution unit 212.

[Step 3] Procedure execution unit 212 analyzes the reply and gets a second assignment to "v1".

[Step 4] A hypertext including the value obtained by subtracting 1 from the second assignment to "v1" as a result is created, and the hypertext is output to transmitter 203. Then, the operation stops.

Next, the definition of a procedure is explained in detail. When variables or values include characters ":", "/", "?", "=", "&", "%", and the like, they are respectively represented by "%3A", "%2F", "%3F", "%3D", "%26" and "%25", each of which is created by concatenating "%" and an ASCII cord of the character, as CGI defines. Generally, some methods can be used to extract a pair of an argument name and its value. For example, "("and")" can be used as a start symbol and an end symbol, respectively. Instead, an escape method, which replaces a character with another string, can be used.

In the following, it is explained that user inputs, operations of remote procedure client 100 and operations of remote procedure server 200 when a remote procedure that calculates a factorial is defined.

[Step 1] The user inputs a URL (uniform resource locator) represented by string "http://host2/define" through user input unit 102 in order to request of remote procedure server 200 to define a remote procedure.

[Step 2] Message creator 104 requests of transmitter 106 to send message "GET /define" to receiver 202 represented by "host2".

[Step 3] Transmitter 106 sends the message to receiver 202.

[Step 4] Receiver 202 inputs the received message to message analyzer 204.

[Step 5] Message analyzer 204 analyzes the message. Since the message is a definition hypertext output request, message analyzer 204 requests of definition hypertext output unit 209 to output a hypertext.

[Step 6] Definition hypertext output unit 209 output the following hypertext (3) to transmitter 203.

(4)

<HEAD>
<TITLE> Page for defining remote procedure </TITLE>
</HEAD>
<H1> Page for defining remote procedure </H1>
<HR>
<FORM METHOD="post" ACTION="/define">
Designation of attributes:
   <INPUT NAME="attribute" TYPE="entry"><P>
Designation of procedure specification:
   <INPUT NAME="spec" TYPE="entry"><P>
Designation of procedure definition:
   <INPUT NAME="definition" TYPE="entry"><P>
<INPUT TYPE="submit" VALUE="Execution of Definition">
</FORM>
<HR>

[Step 7] Transmitter 203 outputs the hypertext (3) to receiver 107.

[Step 8] Receiver 107 analyzes the received hypertext (3) and requests of hypertext output unit 109 to display the hypertext (3).

[Step 9] Hypertext output unit 109 displays the hypertext (3) to show it to the user.

[Step 10] According to the displayed hypertext (3), the user inputs "name=factorial" as an attribute and the following procedure specification (4).

(4)

<HEAD>
<TITLE> Page for factorial </TITLE>
</HEAD>
<H1> Page for factorial </H1>
Receiving an integer or an hyperlink, and returning the factorial thereof
<HR>
<FORM METHOD="get" ACTION="/factorial">
Argument: <INPUT NAME="arg" TYPE="entry"><P>
<INPUT TYPE="submit" VALUE="start functional up">
</FORM>
<HR>

[Step 11] Next, the user inputs a procedure definition according to the following process.

[Substep a] The user inputs "http://host2/if" through a keyboard in order to get the procedure specification of a conditional branch procedure.

[Substep b] Message creator 104 requests of transmitter 106 to send message "GET /if" to receiver 202 identified by "http://host2".

[Substep c] Transmitter 106 sends the message to receiver 202.

[Substep d] Receiver 202 outputs the received message to message analyzer 204.

[Substep e] Message analyzer 204 analyzes the message (3). Since the message (3) is a procedure specification export request, message analyzer requests of remote procedure manager 210 to retrieve remote procedure container 211 whose attribute is "if" and to request of the retrieved remote procedure container 211 to export its procedure specification.

[Substep f] Remote procedure manager 210 retrieves remote procedure container 211(1) whose attribute is "if", and requests of the retrieved remote procedure container 211 (1) to export its procedure specification.

[Substep g] Remote procedure container 211(1) requests of procedure specification export unit 2112(1) to export the specification.

[Substep h] Procedure specification export unit 2112(1) outputs the specification regarding the procedure definition stored by procedure definition unit 2113(1) in the form of a hypertext in response to the hypertext export request.

[Substep i] Remote procedure manager 210 returns the hypertext as a reply to receiver 107 through transmitter 203.

[Substep j] Receiver 107 inputs the received hypertext to hypertext analyzer 108.

[Substep k] Hypertext analyzer 108 analyzes the input hypertext, requests of hypertext output unit 109 to output the hypertext, and outputs message creation information to message creator 104.

[Substep l] According to the output hypertext, the user specifies "arg" as an item of condition and set "1" as an item when the condition is not satisfied. Then, the user gets a procedure specification of multiplication so as to input the expression when the condition is satisfied. At this moment, message memory 105 stores the following message.

(5)    (http://host2/if
        v1=arg
        v2=
        v3=1
    )

[Substep m] The user inputs "http://host2/times" through a keyboard in order to get the procedure specification of multiplication.

[Substep n] The same operations as those executed to get the procedure specification of conditional branch are executed. However, "if", "remote procedure container 211(1), attribute memory 2111(1), and procedure specification export unit 2112(1) in the operation for conditional branch are replaced by "times", "remote procedure container 211(2), attribute memory 2111(2), and procedure specification export unit 2112(2), respectively. Receiver 107 receives a hypertext as a reply.

[Substep o] Receiver 107 inputs the hypertext to hypertext analyzer 108.

[Substep p] Hypertext analyzer 108 analyzes the input hypertext, sends an output request to hypertext output unit 109, and outputs message creation information to message creator 104.

[Substep q] According to the output hypertext, the user specifies "arg" and "factorial" as second and first arguments, respectively.

[Substep r] The user inputs "http://host2/dec" in order to get a procedure specification of decrement.

[Substep s] The same operations as those executed to get the procedure specification of conditional branch are executed. However, "if", "remote procedure container 211(1), attribute memory 2111(1), and procedure specification export unit 2112(1) in the operation for conditional branch are replaced by "dec", "remote procedure container 211(3), attribute memory 2111(3), and procedure specification export unit 2112(3), respectively. Receiver 107 receives a hypertext as a reply.

[Substep t] Hypertext analyzer 108 analyzes the input hypertext, sends an output request to hypertext output unit 109, and outputs message creation information to message creator 104.

[Substep u] According to the output hypertext, the user specifies "arg" as a first argument.

Figure 2:
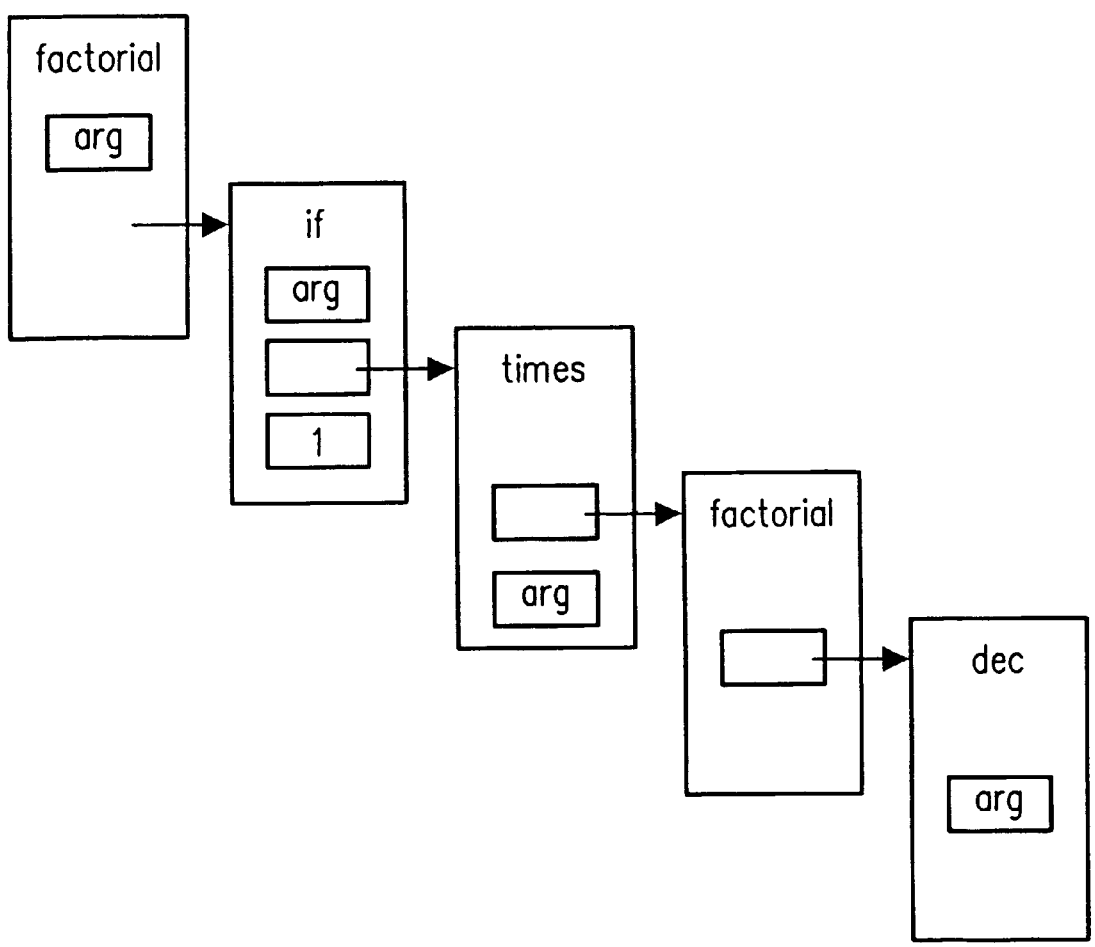
FIG. 2 shows a concept of the operations of the first embodiment.

[Step 12] The procedure definition created by the user is shown in the following. Also, the concept of the procedure definition is shown in FIG. 2.

(6)    (http://host2/if
        v1=arg
        v2=(http://host2/times
            v1=(http://host2/factorial
                arg=(http://host2/dec
                    vi=arg
                )
            )
        v2=arg
        )
        v3=1
    )

[Step 13] When the user clicks the "Execute Definition" button on a display by using a mouse, message creator 104 outputs a procedure definition request message that includes the above-described hypertext to transmitter 106.

[Step 14] When receiver 202 receives the procedure definition request message, it outputs the procedure definition request message to message analyzer 204.

[Step 15] Message analyzer 204 analyzes the input procedure definition request message, extracts an attribute definition expression, a procedure specification expression and a procedure definition expression, and respectively inputs the attribute definition, procedure specification expression and procedure definition expression to attribute creator 206, procedure specification creator 207 and procedure definition creator 208.

[Step 16] When attribute creator 206 receives attribute definition expression "name=factorial", it analyzes the attribute definition expression and create attribute memory 2111(a) (not shown in the figure) that stores "factorial" as an attribute value of attribute "name".

[Step 17] When procedure specification creator 207 receives the procedure specification definition expression, it creates procedure specification export unit 2112(a) (not shown in the figure) that stores the procedure specification definition expression.

[Step 18] When procedure definition creator 208 receives the procedure definition expression, it creates procedure definition unit 2113(a) (not shown in the figure) that stores the received procedure definition expression and outputs a message obtained by transforming the procedure definition expression according to a procedure definition algorithm to transmitter 203.

In this embodiment, procedure definition unit 2113(a) is defined as an interpreter. However, it is possible that the procedure definition unit stores object codes obtained by compiling the procedure definition expression.

Next, an invocation of the defined remote procedure is explained in detail. Here, an example that calls the remote procedure of factorial defined above in the embodiment, is explained.

The user inputs string "http://host2/factorial" and a message creation request into user input unit 102 in order to get the specification of factorial. Message creator 104 receives the string as a message creation information and creates a message therefrom. More in detail, message creator 104 creates a message to remote procedure container 211 corresponding to name attribute "factorial" and requests of transmitter 106 to send the message to receiver 202 corresponding to "http://host2". Transmitter 106 retrieves receiver 202, which corresponds to string "http://host2/". Then, transmitter 106 send message "GET/factorial" to receiver 202. When receiver 202 receives the message, it inputs the message into message analyzer 204.

Message analyzer 204 analyzes the message and requests of remote procedure manager 210 to retrieve procedure specification export unit 2112($a$) in which the value of attribute "name" is "factorial" and export the specification. Remote procedure manager 210 retrieves remote procedure 211($a$) (not shown in the figure) and requests of the retrieved remote procedure 211($a$) to export the specification. Remote procedure container 211($a$) requests of procedure specification export unit 2112($a$) to export the specification. Procedure specification export unit 2112($a$) outputs the following hypertext (7) of a procedure specification.

(7)
```
<HEAD>
<TITLE> Page for factorial </TITLE>
</HEAD>
<H1> Page for factorial </H1>
Receiving an integer or a hyperlink, and returning the
   factorial thereof
<HR>
<FORM METHOD="GET" ACTION="/factorial">
Argument: <INPUT NAME="arg" TYPE="entry"><P>
<INPUT TYPE="submit" VALUE="Start Functional
   Up">
</FORM>
<HR>
```

Remote procedure manager 210 returns the hypertext of the specification as a reply to receiver 107 via transmitter 203. The receiver 107 that receives the hypertext outputs the hypertext to hypertext analyzer 108. According to the hypertext, hypertext analyzer 108 requests of hypertext output unit 109 to display the specification for the factorial procedure to show it to the user. The specification shows that, for example, the procedure has one hyperlink or decimal integer argument and returns the factorial of the argument as a result, or message creation information used to request a procedure execution is "http://host2/factorial".

The user instructs user input unit 102 to assign "2" to the argument. According to the assignment to the argument and the message creation information, message creator 104 requests of transmitter 106 to send message "GET /factorial?arg=2" to the host represented by "http://host2". Transmitter 106 sends message "GET/factorial?arg=2" to receiver 202.

Receiver 202 that receives the message inputs the message to message analyzer 204. Message analyzer 204 analyzes the message and requests of remote procedure manager 210 to execute procedure definition of procedure definition unit 2113($a$) contained by remote procedure container 211 in which the value of attribute "name" is "factorial" under the environment in which "2" is assigned to variable "arg". In other words, remote procedure manager 210 retrieves remote procedure container 211($a$) and requests of remote procedure execution unit 212 to execute the procedure definition contained by procedure definition unit 2113($a$) in the retrieved remote procedure container 211($a$).

Procedure execution unit 212 requests of procedure execution environment manager 213 to bind "2" to variable "arg". Procedure execution unit 212 transforms the following expression (8) into the message (9) according to the list transformation algorithm.

(8)
```
(http://host2/if
    v1=arg
    v2=(http://host2/times
        v1=(http://host2/factorial
            arg=(http://host2/dec
                v1=arg
            )
        )
        v2=arg
    )
    v3=1
)
```

(9)
http://host2/if?v1=2&v2=http%3A%2F%2Fhost2%2Ftimes%3Fv1%3Dhttp%253A%252F%252Fhost2%252Ffactorial%253Farg%253Dhttp%25253A%25252F%25252Fhost2%25252Fdec%25253Fv1%25253D2%26v2%3D2&v3=1

Next, according to the message (9), procedure execution unit 212 requests of transmitter 203 to send the following message to the receiver corresponding to "http://hosts".

(10)
GET /if?v1=2&v2=http%3A%2F%2Fhost2%2Ftimes%3Fv1%3Dhttp%253A%252F%252Fhost2%252Ffactorial%253Farg%253Dhttp%25253A%25252F%25252Fhost2%25252Fdec%25253Fv1%25253D2%26v2%3D2&v3=1

Transmitter 203 sends the message to receiver 202, which corresponds to "http://host2".

Receiver 202 that receives the message inputs the message to message analyzer 204. Message analyzer 204 analyzes the message and requests of remote procedure manager 210 to extract procedure definition of remote procedure container 211 in which value of attribute "name" is "if".

Remote procedure manager 210 retrieves remote procedure container 211(1) and requests of procedure definition unit 2113(1) to output the procedure definition. Procedure definition unit 2113(1) outputs the procedure definition that defines a conditional branch algorithm.

Remote procedure manager 210 requests of procedure execution unit 212 to execute the conditional branch algorithm under the environment as follows.

(11)
v1=2
v2=http://host2/times?v1=http%3A%2F%2Fhost2%2Ffactorial%3Farg%3Dhttp%253A%252F%252Fhost2%252Fdec%253Fv1%253D2&v2=2
v3=1

Procedure execution unit 212 executes the conditional branch algorithm 211-1. Since the assignment to argument "v1" is "2", procedure execution unit 212 analyzes the assignment to argument "v2". Since the assignment to argument "v2" is a hyperlink, procedure execution unit 212 makes a request for sending a message corresponding to the hyperlink. More in detail, procedure execution unit 212 requests of transmitter 203 to send the following message (12) to the receiver identified by "http://host2".

(12)
GET
/times?v1=http%3A%2F%2Fhost2%
2Ffactorial%3Farg%3Dhttp%253A%252F%
252Fhost2%252Fdec%253Fv1%253D2&v2=2

Transmitter 203 sends the message to receiver 202 corresponding to the hyperlink.

eceiver 202 that receives the message inputs the message to message analyzer 204. Message analyzer 204 analyzes the message and requests of remote procedure manager 210 to extract the procedure definition of remote procedure container 211 in which the value of attribute "name" is "times". More in detail, remote procedure manager 210 retrieves remote procedure container 211(2) and requests of procedure definition unit 2113(2) to output the procedure definition. Procedure definition unit 2113(2) outputs the procedure definition that defines a multiplication algorithm.

Remote procedure manager 210 requests of procedure execution unit 212 to executes the multiplication algorithm under the following environment.

(13)
v1=http://host2/factorial?arg=
http%3A%2F%2Fhost2%2Fdec%3Fv1%3D2
v2=2

Procedure execution unit 212 executes the multiplication algorithm.

Procedure execution unit 212 examines the assignment to argument "v1". Since the assignment is a message including a hyperlink, procedure execution unit 212 requests of transmitter 203 to send the message. That is, procedure execution unit 212 requests of transmitter 203 to send the following message (14) to the receiver identified by "http://host2".

(14)
GET                                            /factorial?arg=
http%3A%2F%2Fhost2%2Fdec%3Fv1%3D2

Transmitter 203 sends the message to receiver 202. Receiver 202 that receives the message inputs the message to message analyzer 204. Message analyzer 204 analyzes the message and requests of remote procedure manager 210 to execute the procedure definition of the procedure definition unit contained by remote procedure container 211 in which the value of attribute "name" is "factorial" under the environment in which value "http://host2/dec?v1=2" is assigned to argument "arg".

Remote procedure manager 210 retrieves remote procedure container 211(a) and requests of procedure execution unit 212 to execute the procedure definition contained by procedure definition unit 211(a). Procedure execution unit 212 requests of procedure execution environment manager 213 to bind "http://host2/dec?v1=2" to argument "arg". Procedure execution unit 212 transforms the expression (15) into message (16) according to the list transformation algorithm.

(15)   (http://host2/if
           v1=arg
           v2=(http://host2/times
               v1=(http://host2/factorial
                   arg=(http://host2/dec
                       v1=arg
                   )
               v2=arg
               )
           v3=1
       )

(16)
http://host2/if?v1=
http%3A%2F%2Fhost2%2Fdec%3Fv1%3D2&v2=
http%3A%2F%2Fhost2%2Ftimes%3Fv1%3Dhttp%
253A%252F%252Fhost2%252Ffactorial%253Farg%
253Dhttp%25253A%25252F%25252Fhost2%
25252Fdec%25253Fv1%25253Dhttp%2525253A%
2525252F%2525252Fhost2%2525252Fdec%
2525253Fv1%2525253D2%26v2%3Dhttp%253A%
252F%252Fhost2%252Fdec%253Fv1%253D2&v3=1

Next, procedure execution unit 212 requests of transmitter 203 to send the following message (17) to the receiver corresponding to "http://host2" in accordance with the message (16).

(17)
http://host2/if?v1=
http%3A%2F%2Fhost2%2Fdec%3Fv1%3D2&v2=
http%3A%2F%2Fhost2%2Ftimes%3Fv1%3Dhttp%
253A%252F%252Fhost2%252Ffactorial%253Farg%
253Dhttp%25253A%25252F%25252Fhost2%
25252Fdec%25253Fv1%25253Dhttp%2525253A%
2525252F%2525252Fhost2%2525252Fdec%
2525253Fv1%2525253D2%26v2%3Dhttp%253A%
252F%252Fhost2%252Fdec%253Fv1%253D2&v3=1

Transmitter 203 sends the message (17) to receiver 202, which corresponds to "http://host2". Receiver 202 that receives the message (17) inputs the message to message analyzer 204. Message analyzer 204 analyzes the message and requests of remote procedure manager 210 to extract the procedure definition of remote procedure container 211 in which the value of attribute "name" is "if".

Remote procedure manager 210 retrieves remote procedure container 211(1) and requests of procedure definition unit 2113(1) to output its procedure definition. Procedure definition unit 2113(1) outputs the procedure definition that defines a conditional branch algorithm.

Remote procedure manager 210 requests of procedure execution unit to execute the conditional branch algorithm under the following environment.

(18)
v1=http://host2/dec?v1=2
v2=http://host2/times?v1=
http%3A%2F%2Fhost2%2Ffactorial%3Farg%3Dhttp%
253A%252F%252Fhost2%252Fdec%253Fv1%253
Dhttp%25253A%25252F%25252Fhost2%25252Fdec%
25253Fv1%25253D2&v2=
http%3A%2F%2Fhost2%2Fdec%3Fv1%3D2
v3=1

Procedure execution unit 212 executes the conditional branch algorithm. Since the assignment to argument "v1" is a hyperlink, procedure execution unit 212 makes a request for sending a message corresponding to the hyperlink. More in detail, Procedure execution unit 212 requests of transmitter 203 to send message "GET /dec?v1=2" to receiver 202, which is identified by "http://host2".

Transmitter 203 transmits the message to receiver 202. Receiver 202 that receives the message inputs the message to message analyzer 204. Message analyzer 204 analyzes the message and requests of remote procedure manager 210 to extract the procedure definition of remote procedure container 211 in which the value of attribute "name" is "dec".

Remote procedure manager 210 retrieves remote procedure container 211(3) and request of procedure definition unit 2113(3) to output the procedure definition. Procedure definition unit 2113(3) outputs the procedure definition that defines a decrement algorithm.

Remote procedure manager 210 requests of procedure execution unit 212 to execute the decrement algorithm under the environment of "v1=2". Procedure execution unit 212 executes the decrement algorithm.

Procedure execution unit 212 returns the following hypertext (19) to receiver 202 as a result. This hypertext includes "1", which is the result obtained by subtracting 1 from 2.

(19)

<H2> Result of subtraction </H2>

First argument: 2 <P>

Result: 1 <P>

Procedure execution unit 212 in the conditional branch algorithm receives hypertext as a reply. The procedure execution unit 212 analyzes the reply according to the conditional branch algorithm and get "1" as a second assignment to "v1". Since the second assignment to "v1" is not "0", procedure execution unit 212 examines the assignment to argument "v2". Since the assignment to "v2" is the hypertext shown as follows, procedure execution unit 212 requests of transmitter 203 to send a message.

(20)

v2=http://host2/times?v1=
  http%3A%2F%2Fhost2%2Ffactorial%3Farg%3Dhttp%
  253A%252F%252Fhost2%252Fdec%253Fv1%
  253Dhttp%25253A%25252F%25252Fhost2%
  25252Fdec%25253Fv1%25253D2&v2=
  http%3A%2F%2Fhost2%2Fdec%3Fv1%3D2

More in detail, procedure execution unit 212 requests of transmitter 203 that is represented by "http://host2", to send the following message to receiver 202, which is identified by "http://host2".

(21)

GET
/times?v1=
  http%3A%2F%2Fhost2%2Ffactorial%3Farg%3Dhttp%
  253A%252F%252Fhost2%252Fdec%253Fv1%
  253Dhttp%25253A%25252F%25252Fhost2%
  25252Fdec%25253Fv1%25253D2&v2=
  http%3A%2F%2Fhost2%2Fdec%3Fv1%3D2

Transmitter 203 sends the message to receiver 202. Message analyzer 204 analyzes the message and requests of remote procedure manager 210 to extract the procedure definition of remote procedure container 211 in which the value of an attribute "name" is "times".

Remote procedure manager 210 retrieves remote procedure container 211(2) and requests of procedure definition unit 2113(2) to output the procedure definition. Procedure definition unit 2113(2) outputs a procedure definition that defines an multiplication algorithm.

Remote procedure manager 210 requests of procedure execution unit 212 to execute the multiplication algorithm under the following environment.

(22)

v1=http://host2/factorial?arg=
  http%3A%2F%2Fhost2%2Fdec%3Fv1%3Dhttp%
  253A%252F%252Fhost2%252Fdec%253Fv1%253D2
v2=http://host2/dec?v1=2

Procedure execution unit 212 examines the assignment to argument "v1". Since the assignment is a message including a hyperlink, procedure execution unit 212 requests of transmitter 203 to send a message. More in detail, procedure execution unit 212 requests of transmitter 203 to send the following message to receiver 202, which is identified by "http://host2".

(23)

GET
/factorial?arg=
  http%3A%2F%2Fhost2%2Fdec%3Fv1%3Dhttp%
  253A%252F%252Fhost2%252Fdec%253Fv1%253D2

Transmitter 203 sends the message to receiver 202. Receiver 202, which receives the message, inputs the message to message analyzer 203. Message analyzer 204 analyzes the message and requests of remote procedure manager 210 to extract the procedure definition of remote procedure container 211 in which the value of an attribute "name" is "factorial".

Remote procedure manager 210 retrieves remote procedure container 211(a) and requests of procedure definition unit 2113(a) to output the procedure definition. Procedure definition unit 2113(a) outputs the procedure definition of a factorial algorithm.

Remote procedure manager 210 transforms the expression (25) into the message (26) under the environment (24) according to a list transformation algorithm.

(24)

arg=http://host2/dec?v1=
  http%3A%2F%2Fhost2%2Fdec%3Fv1%3D2

(25)  (http://host2/if
         v1=arg
         v2=(http://host2/times
            v1=(http://host2/factorial
               arg=(http://host2/dec
                  v1=arg
                  )
               )
            v2=arg
            )
         )

(26)

http://host2/if?v1=
  http%3A%2F%2Fhost2%2Fdec%3Fv1%3Dhttp%
  253A%252F%252Fhost2%252Fdec%253Fv1%253D2&
  v2=http%3A%2F%2Fhost2%2Ftimes%3Fv1%
  3Dhttp%253A%252F%252Fhost2%252Ffactorial%
  253Farg%253Dhttp%25253A%25252F%25252Fhost2%
  25252Fdec%25253Fv1%25253Dhttp%2525253A%
  2525252F%2525252Fhost2%2525252Fdec%
  2525253Fv1%2525253Dhttp%252525253A%
  252525252F%252525252Fhost2%252525252Fdec%
  252525253Fv1%252525253D2%26v2%3Dhttp%253A%
  252F%252Fhost2%252Fdec%253Fv1%253Dhttp%
  25253A%25252F%25252Fhost2%25252Fdec%
  25253Fv1%25253D2&v3=1

Next, according to the message (26), procedure execution unit 212 requests of transmitter 203 to send the following message (27) to receiver 202, which corresponds to "http://host2".

(27)

GET
/if?v1=http%3A%2F%2Fhost2%2Fdec%3Fv1%3Dhttp%
  253A%252F%252Fhost2%252Fdec%253Fv1%253D2&
  v2=http%3A%2F%2Fhost2%2Ftimes%3Fv1%3Dhttp%
  253A%252F%252Fhost2%252Ffactorial%253Farg%
  253Dhttp%25253A%25252F%25252Fhost2%
  25252Fdec%25253Fv1%25253Dhttp%2525253A%
  2525252F%2525252Fhost2%2525252Fdec%
  2525253Fv1%2525253Dhttp%252525253A%
  252525252F%252525252Fhost2%252525252Fdec%
  252525253Fv1%252525253D2%26v2%3Dhttp%253A%

252F%252Fhost2%252Fdec%253Fv1%253Dhttp%
25253A%25252F%25252Fhost2%25252Fdec%
25253Fv1%25253D2&v3=1

Transmitter 203 sends the message (27) to receiver 202, which corresponds to "http://host2". Receiver 202, which receives the message, inputs the message to message analyzer 204. Message analyzer 204 analyzes the message and requests of remote procedure manager 210 to extract the procedure definition of remote procedure container 211 in which the value of an attribute "name" is "if".

Remote procedure manager 210 retrieves remote procedure container 211(1) and requests of procedure definition unit 2113(1) to output the procedure definition that defines a conditional branch algorithm.

Remote procedure manager 210 requests of procedure execution unit 212 to execute the conditional branch algorithm under the following environment.

(28)
v1=http://host2/dec?v1=
   http%3A%2F%2Fhost2%2Fdec%3Fv1%3D2v2=http://
   host2/times?v1=
   http%3A%2F%2Fhost2%2Ffactorial%3Farg%3Dhttp%
   253A%252F%252Fhost2%252Fdec%253Fv1%
   253Dhttp%25253A%25252F%25252Fhost2%
   25252Fdec%25253Fv1%25253Dhttp%2525253A%
   2525252F%2525252Fhost2%2525252Fdec%
   2525253Fv1%2525253D2&v2=
   http%3A%2F%2Fhost2%2Fdec%3Fv1%3Dhttp%
   253A% 252F%252Fhost2%252Fdec%253Fv1%253D2
v3=1

Procedure execution unit 212 executes the conditional branch algorithm. As a result, "0" is obtained as the assignment to "v1". To simplify the explanation, details of the execution is not described here. Procedure execution unit 212 outputs the following hypertext (29) according to the conditional branch algorithm.

(29)
<H2> Result of condition matching</H2>
condition:
http://host2/dec?v1=
   http%3A%2F%2Fhost2%2Fdec%3Fv1%3D2<P>
Satisfied:
   http://host2/times?v1=
      http%3A%2F%2Fhost2%2Ffactorial%3Farg%
      3Dhttp%253A%252F%252Fhost2%252Fdec%
      253Fv1%253Dhttp%25253A%25252F%
      25252Fhost2%25252Fdec%25253Fv1%
      25253Dhttp%2525253A%2525252F%
      2525252Fhost2%2525252Fdec%2525253Fv1%
      2525253D2&v2=
      http%3A%2F%2Fhost2%2Fdec%3Fv1%3Dhttp%
      253A%252F%252Fhost2%252Fdec%253Fv1%253D2
<P>
Unsatisfied: 1<P>
Result: 1

Procedure execution unit 212 returns the hypertext as a reply to procedure execution unit 212 that is executing the multiplication algorithm via transmitter 203 and receiver 202. Procedure execution unit 212 analyzes the reply and gets "1" as a second assignment to "v1". Next, in order to get the second assignment to "v2", a message is passed to transmitter 203 according to the first assignment to "v2", which is "http://host2/dec?v1=2". To simplify the explanation, details are not described here; however, procedure execution unit 212 gets an integer "1" as the assignment to "v2".

Then, according to the multiplication algorithm, procedure execution unit 212 gets integer "1" as a result.

Further, procedure execution unit 212 outputs the following hypertext.
(30)
First argument:
   http://host2/factorial?arg=
      http%3A%2F%2Fhost2%2Fdec%3Fv1%3Dhttp%
      253A%252F%252Fhost2%252Fdec%253Fv1%253D2
   <P>
Second argument: http://host2/dec?v1=2
<P>
Result: 1

Procedure execution unit 212 returns the hypertext as a reply to procedure execution unit 212 that is executing the multiplication algorithm via transmitter 203 and receiver 202. Procedure execution unit 212 analyzes the reply and gets "http://host2/factorial?arg=http" as the first assignment to "v1" and "1" as a second assignment to "v1".

Procedure execution unit 212 multiplies the assignment to "v1" by the assignment to "v2" and gets integer "2" as a result.

Procedure execution unit 212 outputs the following hypertext (31).
(31)
<H2> Result of multiplication </H2>
First argument:
   http://host2/factorial?arg=
      http%3A%2F%2Fhost2%2Fdec%3Fv1
   %3D2 <P>
Second argument: 2
<P>
Result: 2

Procedure execution unit 212 returns the hypertext as a reply to procedure execution unit 212 that is executing the conditional branch algorithm via transmitter 203 and receiver 202. Procedure execution unit 212 outputs the following hypertext (32).
(32)
<H2> Call expression </H2>
http://host2/if?v1=2&v2=
   http%3A%2F%2Fhost2%2Ftimes%3Fv1%3Dhttp%
   253A%252F%252Fhost2%252FFactorial%253Farg%
   253Dhttp%25253A%25252F%25252Fhost2%
   25252Fdec%25253Fv1%25253D2%26v2%3D2&v3=1
<H2> Result of multiplication </H2>
First argument:
   http://host2/factorial?arg=
      http%3A%2F%2Fhost2%2Fdec%3Fv1
   %3D2
<P>
Second argument: 2
<P>
Result: 2

Transmitter 203 sends the hypertext (32) as a reply to receiver 107. Receiver 107 outputs the received hypertext to hypertext analyzer 108. Hypertext analyzer 108 analyzes the hypertext and requests of hypertext output unit 109 to display characters according to the result of analysis.

The explanation of the first embodiment is finished here. As described above, according to this configuration, the user can define a procedure easily by using a template of procedure definition and execute the defined procedure on a server.

[Second Embodiment]

In the second embodiment, same as the first embodiment, interfaces of plural remote procedure are exported by using hypertexts and a remote procedure is defined by combining them as a hypertexts.

Figure 3:
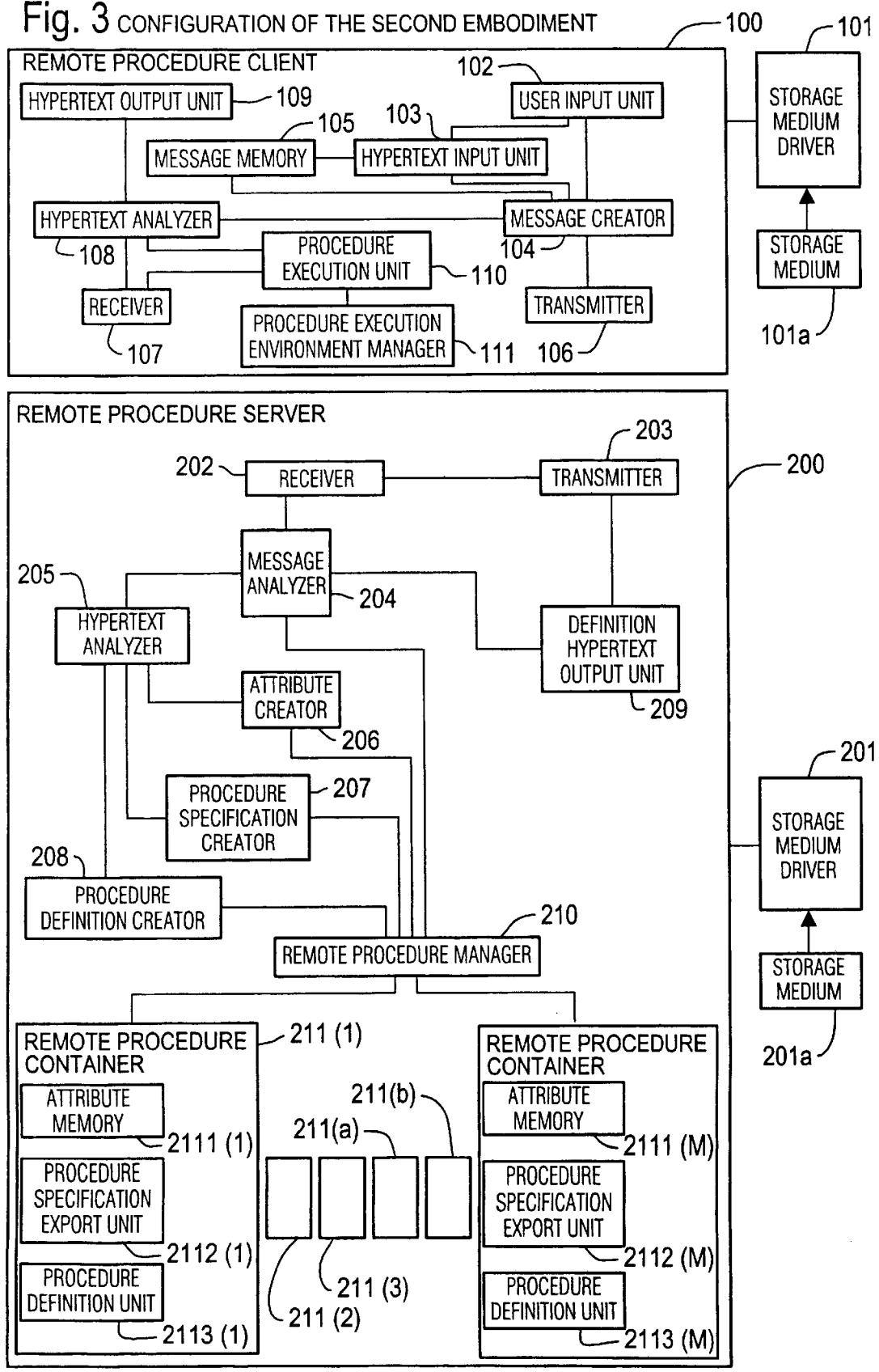
FIG. 3 is a block diagram illustrating the configuration of the second embodiment of the present invention.

FIG. 3 is a block diagram showing the configuration of the second embodiment. According to this figure, the second embodiment is different from the first embodiment in that remote procedure client 100 executes procedures, instead of remote procedure server 200. In other words, remote procedure client has procedure execution unit 110 and procedure execution environment manager 111. Procedure execution unit 110 executes a procedure according to a list of arguments inputted by message analyzer 204. During a procedure execution, when another procedure execution by remote procedure container 211 is requested, a message is sent through message analyzer 204. In FIG. 2, since the other configuration of the second embodiment is the same as that of the first embodiment, the same number is given to the corresponding unit and details are not described here.

Next, an example that synthesizes a procedure that retrieves a page and a procedure that retrieves a child page.

In this example, all procedure definition units 2113 are supposed to have arguments "v1", "v2" and "v3" for convenience of explanation, unless otherwise provided. We use the notation of a message as "http://host2/fname?v1=a1&v2=a2". It means that remote procedure container 211 including attribute memory 2111 in which the attribute value of attribute "name" is "fname" has arguments "v1", "v2", or the like. The message also means that values "a1" and "a2" are assigned to arguments "v1" and "v2", respectively.

At the beginning, remote procedure container 211(4), which stores information related to a reference extraction procedure, is explained. Attribute memory 2111(4) of remote procedure container 211(4) stores an attribute in that the value of attribute name "name" is "/children".

Procedure specification export unit 2112(4) stores the following specification.

(33)
<HEAD>
<TITLE> Page for extracting references </TITLE>
</HEAD>
<H1> Page for extracting references </H1>
Page for extracting references included in a page as a list
    <P>
<HR>
<FORM METHOD="GET" ACTION="http://host2/children">
URL of page: <INPUT NAME="v1" TYPE="entry">
    <P>
<INPUT TYPE="submit" VALUE="Start Function">
</FORM>

Procedure definition unit 2113(4) stores such a procedure definition that procedure execution unit 110 follows the following reference extraction algorithm.

[Step 1] "0" is set to variable "count", that stores the number of the found references.
[Step 2] The assignment to "v1" is outputted to transmitter 106, and a reply is received from receiver 107. This reply is referred as "reply 1".
[Step 3] Header information is outputted.
[Step 4] The reply 1 is analyzed and characters are read until a reference start mark appears. When a reference start mark appears, the control goes to the next step. When the reply is analyzed to the end, the control goes to step 7.
[Step 5] A delimiter of a list is outputted.
[Step 6] Characters from the reference start mark to a reference end mark are outputted. The value of variable "count" is incremented and the control goes to step 4.
[Step 7] "0" is outputted, when the value of variable "count" is "0".
[Step 8] A footer information is outputted.

Next, remote procedure container 211(5), which stores information related to a procedure that examines the title of a page, is explained. Attribute memory 2111(5) of remote procedure container 211(5) stores an attribute in that the value of the attribute name "name" is "/title-is".

Procedure specification export unit 2112(5) stores the following hypertext.

(34)
<HEAD>
<TITLE> Page for examining the title of a page </TITLE>
</HEAD>
<H1> Page for examining the title of a page </H1>
Page for examining whether the title of a page is the same as an argument <P>
<HR>
<FORM METHOD="GET" ACTION="http://host2/title-is">
URL of page: <INPUT NAME="v1" TYPE="entry"><P>
Title: <INPUT NAME="v2" TYPE="entry"><P>
<INPUT TYPE="submit" VALUE="Start Function">
</FORM>

Procedure definition unit 2113(5) stores such a procedure definition that procedure execution unit 110 follows the following title examination algorithm.

[Step 1] The assignment to variable "v1" is outputted to transmitter 106, and a reply is received from receiver 107. This reply is referred as "reply 1".
[Step 2] Header information is outputted.
[Step 3] The reply 1 is analyzed, and characters are read until a title start mark appears.
[Step 4] Characters between the end of title start mark and the head of title end mark are outputted as a title.
[Step 5] The title is compared with a string, which is the assignment to variable "v2".
[Step 6] As a result of the comparing, the title is outputted when they are matched. Meanwhile, "0" is outputted when they are not matched.

Next, remote procedure container 211(6), which stores information related to a procedure that loads the first reference included in a page, is explained. Attribute memory 2111(6) of remote procedure container 211(6) stores an attribute in that the value of the attribute name "name" is "first".

Procedure specification export unit 2112(6) stores the following hypertext.

(35)
<HEAD>
<TITLE> Page for loading the first reference included in a page </TITLE>
</HEAD>
<H1> Page for loading the first reference included in a page </H1>
Loading the first reference included in the specified page<P>
<HR>
<FORM METHOD="GET" ACTION="http://host2/first">
URL of page: <INPUT NAME="v1" TYPE="entry"><P>
<INPUT TYPE="submit" VALUE="Start Function">
</FORM>

Procedure definition unit 2113(6) stores such a procedure definition that procedure execution unit 110 follows the following title examination algorithm.

[Step 1] The assignment to "v1" is outputted to transmitter 106 and a reply is received from receiver 107. This reply is referred as "reply 1".

[Step 2] The reply 1 is analyzed from the head, and the reference that comes first is set to "reference 1".

[Step 3] The reference 1 is outputted to transmitter 106, and a reply is received from receiver 107. This reply is referred as "reply 2".

[Step 4] The reply 2 is outputted through transmitter 106.

Next, remote procedure container 211(7), which stores information related to a procedure that extracts references on and after the second reference included in a page, is explained. Attribute memory 2111(7) of remote procedure container 211(7) stores an attribute in that the value of the attribute name "name" is "rest".

Procedure specification export unit 2112(7) stores the following hypertext.

(36)
<HEAD>
<TITLE> Page for extracting elements on and after the second element in a list </TITLE>
</HEAD>
<H1> Page for extracting elements on and after the second element in a list </H1>
Page for extracting elements on and after the second element in a list, and outputting the extracting elements as a list
<P>
Outputting "0" when there is no element on and after the second element in a list
<HR>
<FORM METHOD="GET" ACTION="http://host2/rest">
URL of page: <INPUT NAME="v1" TYPE="entry"><P>
<INPUT TYPE="submit" VALUE="Start Function">
</FORM>

Procedure definition unit 2113(7) stores such a procedure definition that procedure execution unit 110 follows the following algorithm.

[Step 1] "0" is set to variable "count", that stores the number of the found references.

[Step 2] The assignment to "v1" is outputted to transmitter 106 and a reply is received from receiver 107. This reply is referred as "reply 1".

[Step 3] Header information is outputted.

[Step 4] The reply 1 is analyzed, and characters are read until a reference start mark appears. When a reference start mark appears, the control goes to the next step. When the reply is analyzed to the end, the control goes to step 7.

[Step 5] When "count" is "0", "count" is incremented and the control goes to step 4. Otherwise, a delimiter of a list is outputted and the control goes to the next step.

[Step 6] Characters between the reference start mark and a reference end mark is outputted. The variable "count" is incremented and the control goes to the next step.

[Step 7] "0" is outputted, when the value of variable "count" is "0" or "1".

[Step 8] Footer information is outputted.

Next, an example of operations that defines a new procedure is explained. The following explains user inputs, operations of remote procedure client 100 and operations of remote procedure server 200, when remote procedure that retrieves a page is defined.

[Step 1] The user inputs a URL represented by string "http://host2/define" through user input unit 102 in order to request of remote procedure server 200 to define a remote procedure.

[Step 2] Message creator 104 requests of transmitter 106 to send message "GET/define" to receiver 202 identified by "host2".

[Step 3] Transmitter 106 sends the message to receiver 202.

[Step 4] Receiver 202 inputs the received message to message analyzer 204.

[Step 5] Message analyzer 204 analyzes the message. Since the message is a definition hypertext output request, message analyzer 204 requests of definition hypertext output unit 209 to output a hypertext.

[Step 6] Definition hypertext output unit 209 outputs the following hypertext to transmitter 203.

(37)
<HEAD>
<TITLE> Page for defining remote procedure </TITLE>
</HEAD>
<H1> Page for defining remote procedure </H1>
<HR>
<FORM METHOD="POST" ACTION="/define">
Designation of attribute:
<INPUT NAME="attribute" TYPE="entry"><P>
Designation of procedure specification:
<INPUT NAME="spec" TYPE="entry"><P>
Designation of procedure definition:
<INPUT NAME="definition" TYPE="entry"><P>
<INPUT TYPE="submit" VALUE="Execution of definition">
</FORM>
<HR>

[Step 7] Transmitter 203 outputs the hypertext to receiver 107.

[Step 8] Receiver 107 analyzes the received hypertext and requests of hypertext output unit 109 to display the hypertext.

[Step 9] Hypertext output unit 109 displays the hypertext to show it to the user.

[Step 10] According to the displayed hypertext, the user inputs "name=find" as an attribute, and the following procedure specification.

(38)
<HEAD>
<TITLE> Page for retrieving a page </TITLE>
</HEAD>
<H1> Page for retrieving a page </H1>
Receiving a hyperlink and a title, and tracing links until finding a page having the title
<HR>
<FORM METHOD="GET" ACTION="/find">
Start page: <INPUT NAME="url" TYPE="entry"><P>
Title: <INPUT NAME="title" TYPE="entry"><P>
<INPUT TYPE="submit" VALUE="Start Functional Up">
</FORM>
<HR>

[Step 11] Next, the user inputs a procedure definition according to the following process.

[Substep a] The user inputs "http://host2/if" by using a keyboard in order to get the procedure specification of the conditional branch procedure.

[Substep b] Message creator 104 requests of transmitter 106 to send message "GET/if" to receiver 202 represented by "http://host2".

[Substep c] Transmitter 106 sends the message to receiver 202.

[Substep d] Receiver 202 outputs the received message to message analyzer 204.

[Substep e] Message analyzer 204 analyzes the message. Since the message is a procedure specification export request, message analyzer 204 requests of remote procedure manager 210 to retrieve remote procedure container 211 whose value of attribute name is "if" and to request of the retrieved remote procedure container 211 to export its procedure specification.

[Substep f] Remote procedure manager 210 retrieves remote procedure container 211(1) whose attribute is "if", and requests of the retrieved remote procedure container 211(1) to export its procedure specification.

[Substep g] Remote procedure container 211(1) requests of procedure specification export unit 2112(1) to export the specification.

[Substep h] Procedure specification export unit 2112(1) outputs the specification related to the procedure definition contained by procedure definition unit 2113(1) in the form of a hypertext in response to the hypertext export request.

[Substep i] Remote procedure manager 210 returns the hypertext as a reply to receiver 107 through transmitter 203.

[Substep j] Receiver 107 inputs the received hypertext to hypertext analyzer 108.

[Substep k] Hypertext analyzer 108 analyzes the input hypertext, requests of hypertext output unit 109 to output the hypertext, and outputs message creation information to message creator 104.

[Substep l] According to the output hypertext, the user specifies "url" as an item when the condition satisfies. Then, the user gets the specification of a procedure that examines a title in order to input an expression of condition. At this moment, message memory 105 stores the following message (39).

```
(39)    (http://host2/if
            v1=
            v2=url
            v3=
        )
```

[Substep m] The user inputs "http://host2/titile-is" by using a keyboard in order to get the specification of a procedure that examines a title.

[Substep n] A message is sent through message creator 104 and transmitter 106. Then, a hypertext is received as a return from procedure specification export unit 2112(5).

[Substep o] Receiver 107 inputs the received hypertext to hypertext analyzer 108.

[Substep p] Hypertext analyzer 108 analyzes the input hypertext, sends an output request to hypertext output unit 109, and outputs message creation information to message creator 104.

[Substep q] According to the output hypertext, the user specifies "url" and "title" as the first and second arguments, respectively.

[Substep r] Then the user specifies the third argument of the procedure "if". At this time, since the user wants to specify undefined procedure "find-sub", the user directly inputs the following call expression through a keyboard.
(40)
http://host2/find-sub urls=(http://host2/children v1=url) title=title

[Step 12] The final procedure definition created by the user is shown in the following. Also, the concept of the procedure definition is shown in the upper part of FIG. 4.

```
(41)    (http://host2/if
            v1=(http://host2/title-is
                v1=url
                v2--title
            )
            v2=url
            v3=(http://host2/find-sub
                urls=(http://host2/children
                    v1=url
                )
                title=title
            )
        )
```

[Step 13] When the user clicks the "Execute Definition" button on the display by using a mouse, message creator 104 outputs a procedure definition request message that includes the above-described hypertext to transmitter 106.

[Step 14] When receiver 202 receives the procedure definition request message, it outputs procedure definition request message to message analyzer 204.

[Step 15] Message analyzer 204 analyzes the input procedure definition request message, extracts an attribute definition expression, a procedure specification expression and a procedure definition expression, and respectively inputs to attribute creator 206, procedure specification creator 207 and procedure definition creator 208.

[Step 16] When attribute creator 206 receives an attribute definition expression "name=find", it analyzes the definition expression and create attribute memory 2111(a) (not shown in the figure) that stores "find" as an attribute value of "name".

[Step 17] When procedure specification creator 207 receives the procedure specification definition expression, it creates procedure specification export unit 2112(a) (not shown in the figure) that stores the procedure specification definition expression.

[Step 18] When procedure definition creator 208 receives the procedure definition expression, it creates procedure definition unit 2113(a) (not shown in the figure) that stores the received procedure definition expression and outputs a message obtained by transforming the procedure definition expression to transmitter 203.

Next, the user creates remote procedure container 211(b) by using the same method as that of procedure "find".

Procedure specification export unit 2112(b) of procedure container 211(b) stores the following hypertext.
(42)
<HEAD>
<TITLE> Page for retrieving a child page </TITLE>
</HEAD>
<H1> Page for retrieving a child page </H1>
Receiving a hyperlink and a title, and tracing links until finding a child page having the title
<HR>
<FORM METHOD="GET" ACTION="/find-sub">
Start Page: <INPUT NAME="urls" TYPE="entry"22
<P>
Title: <INPUT NAME="title" TYPE="entry"><P>
<INPUT TYPE="submit" VALUE="Start Functional Up">
</FORM>

\<HR\>

Procedure definition unit 2113(b) of procedure container 211(b) stores the following expression. Also, the concept of the procedure definition is shown in the lower part of FIG. 4.

```
(43)    (http://host2/if
            v1=urls
            v2=(http://host2/if
                v1=(http://host2/find
                    url=(http://host2/first
                        v1=urls
                    )
                    title=title)
                )
                v2=(http://host2/find
                    url=(http://host2/first
                        v1=urls
                    )
                    title=title)
                )
                v3=(http://host2/find-sub
                    urls=(http://host2/rest
                        v1=urls
                    )
                    title=title
                )
            )
            v3=0
        )
```

Next, an operation when the defined remote procedure is called is explained by using an example. Here, an example that calls a remote procedure of a page retrieval, which is defined above in the embodiment, is explained.

The user inputs string "http://host2/factorial" and a message creation request into user input unit 102 in order to get the specification of "find".

Message creator 104 receives the string as a message creation information and creates a message therefrom. More in detail, message creator 104 creates a message to remote procedure container 211 corresponding to the name attribute "find" and requests of transmitter 106 to send the created message to receiver 202 corresponding to "http://host2". Transmitter 106 retrieves receiver 202, which corresponds to string "http://host2". Then, transmitter 106 sends message "GET/find" to receiver 202.

Receiver 202 that receives the message inputs the message into message analyzer 204. Message analyzer 204 analyzes the message and requests of remote procedure manager 210 through transmitter 203 and receiver 107 to retrieve procedure specification export unit 2112(a) in which the value of attribute "name" is "find" and to export the specification.

Remote procedure manager 210 retrieves remote procedure container 211(a) (not shown in the figure) and requests of the retrieved remote procedure 211(a) to export the specification. Remote procedure container 211(a) requests of procedure specification export unit 2112(a) to export the specification. Procedure specification export unit 2112(a) outputs a hypertext representing the procedure specification. Remote procedure manager 210 returns the hypertext as a reply to receiver 107 through transmitter 203.

Receiver 107 that receives the hypertext outputs the hypertext to hypertext analyzer 108. According to the hypertext, hypertext analyzer 108 requests of hypertext output unit 109 to display that the message creation information that requests procedure execution is "http://host2/find".

The user instructs user input unit 102 to assign "http://host3/aaa" and "ccc" to the arguments. According to the assignment to the arguments and the message creation information, message creator 104 requests of transmitter 106 to send message "GET/find?url=(http://host3/aaa)&title=ccc" to the host identified by "http://host2". Transmitter 106 sends the message "GET/find?url=(http://host3/aaa)&title=ccc" to receiver 202.

Receiver 202, which receives the message, inputs the message to message analyzer 204. Message analyzer 204 analyzes the message, retrieves the procedure definition stored in procedure definition unit 2113(a) of remote procedure container 211(a) in which the value of attribute "name" is "find", and through transmitter 203 and receiver 107, requests of procedure execution unit 110 to execute the procedure definition of procedure definition unit 2113(a) by giving "http://host3/aaa" as the value of variable "url" and "ccc" as the value of variable "title". Procedure execution unit 110 transforms the following expression (44) into the message (45) in accordance with the list transformation algorithm described above. Here, message (45) is written in the readable form.

```
(44)    (http://host2/if
            v1=(http://host2/title-is
                v1=url
                v2=title
            )
            v2=url
            v3=(http://host2/find-sub
                urls=(http://host2/children
                    v1=url
                )
                title=title
            )
        )
(45)    http://host2/if?
            v1=(http://host2/title-is?
                v1=(http://host3/aaa)&
                v2=(ccc)
            )&
            v2=(http://host3/aaa)&
            v3=(http://host2/find-sub?
                urls=(http://host2/children?
                    v1=(http://host3/aaa)
                )&
                title=(ccc)
            )
        )
```

Next, according to the message, procedure execution unit 110 requests of transmitter 106 to send the following message (46) to the receiver corresponding to "http://host2".

```
(46)    GET /if?
            v1=(http://host2/title-is?
                v1=(http://host3/aaa)&
                v2=(ccc)
            )&
            v2=(http://host3/aaa)&
            v3=(http://host2/find-sub?
                urls=(http://host2/children
                    v1=(http://host3/aaa)
                )&
                title=(ccc)
            )
        )
```

Transmitter 106 sends the message to receiver 202, which corresponds to "http://host2". Receiver 202, which receives the message, inputs the message to message analyzer 204. Message analyzer 204 analyzes the message and requests of remote procedure manager 210 to extract the procedure definition of the remote procedure container in which the value of attribute "name" is "if".

Remote procedure manager 210 retrieves remote procedure container 211(1) and requests of procedure definition unit 2113(1) to output the procedure definition.

Remote procedure manager 210 send a message through transmitter 203 in order to request of procedure execution unit 110 to execute the conditional branch algorithm under the following environment (47).

(47)  v1=(http://host2/title-is?
          v1=(http://host3/aaa)&
          v2=(ccc)
          )
      v2=(http://host3/aaa)
      v3=(http://host2/find-sub?
          urls=(http://host2/children?
              v1=(http://host3/aaa)
              )&
          title=(ccc)
          )

Procedure execution unit 110 executes the conditional branch algorithm. Since the assignment to argument "v1" is a hyperlink, procedure execution unit 110 requests of the transmitter 106 to send the following message to the receiver identified by "http://host2".

(48)
   GET /title-is?
      v1=(http://host3/aaa)&
      v2=(ccc)

Transmitter 106 sends the message to receiver 202. Receiver 202, which receives the message, inputs the message to message analyzer 204. Message analyzer 204 analyzes the message and requests of remote procedure manager 210 to extract the procedure definition of the remote procedure container in which the value of attribute "name" is "title-is".

Remote procedure manager 210 retrieves remote procedure container 211(5) and requests of procedure definition unit 2113(5) to output the procedure definition. Procedure definition unit 2113(5) outputs the procedure definition that defines a title extraction algorithm.

Remote procedure manager 210 requests of procedure execution unit 110 via transmitter 203 and receiver 107 to execute the title extraction algorithm under the following environment (49). Procedure execution unit 110 executes the algorithm.

(49)
   v1=http://host3/aaa
   v2=ccc

Procedure execution unit 110 examines the assignment to argument "v1". Since the assignment to argument "v1" is a message including a hyperlink, procedure execution unit 110 requests of transmitter 106 to send a message. More in detail, procedure execution unit 110 requests of transmitter 106 to send "GET /aaa" to the receiver identified by "http://host3" (not shown in the figure). The receiver identified by "http://host3" analyzes the message and outputs the following hypertext as a reply to receiver 107.

(50)
   <HEAD>
   <TITLE> aaa </TITLE>
   </HEAD>
   <H1>Page of aaa </H1>
   <HR>
   <A HREF="http://host3/bbb">Reference1 </A>
   <A HREF="http://host3/ccc">Reference2 </A>
   <A HREF="http://host3/ddd">Reference3 </A>

Procedure execution unit 110 extracts title "bbb" from the received hypertext in accordance with the title extraction algorithm. Since the extracted title is not equal to "ccc", "0" is returned as a reply. 0195

Procedure execution unit 110, which receives the reply, examines the assignment to variable "v3" according to the conditional branch algorithm. Since the assignment to variable "v3" is the following hyperlink (51), message (52) that corresponds to the hyperlink is sent from transmitter 106.

(51)  http://host2/find-sub?
          urls=(http://host2/children?
              v1=(http://host3/aaa)
              title=(ccc)
(52)  GET /find-sub?
          urls=(http://host2/children?
              v1=(http://host3/aaa)
              )&
          title=(ccc)

Transmitter 106 sends the message (52) to receiver 202. Receiver 202, which receives the message, inputs the message to message analyzer 204. Message analyzer analyzes the message and requests of remote procedure manager 210 to execute the procedure definition stored in the procedure definition unit of remote procedure container in which the value of attribute "name" is "find-sub" under the following environment (53). According to the request, remote procedure manager 210 retrieves remote procedure container 211(b) and requests of procedure execution unit 110 via transmitter 203 and receiver 107 to execute the procedure definition stored in procedure definition unit 2113(b).

(53)  urls=(http://host2/children?
          v1=(http://host3/aaa)
          )
      title=(ccc)

Procedure execution unit 110 transforms the following expression (54) into the message (55) in accordance with the list transformation algorithm.

(54)  (http://host2/if
          v1=urls
          v2=(http://host2/if
              v1=(http://host2/find
                  url=(http://host2/first
                      v1=urls
                      )
                  title=title)
                  )
              v2=(http://host2/find
                  url=(http://host2/first
                      v1=urls
                      )
                  title=title)
                  )
              v3=(http://host2/find-sub
                  urls=(http://host2/rest
                      v1=urls
                      )
                  title=title
                  )
              )
          v3=0
          )

```
(55)
(http://host2/if?
        v1=(http://host2/children?
                v1=(http://host3/aaa)
                )&
        v2=(http://host2/if?
                v1=(http://host2/find?
                        url=(http://host2/first
                                v1=(http://host2/children?
                                        v1=(http://host3/aaa)
                                        )
                                )&
                        title=(ccc))
                        )&
                v2=(http://host2/find?
                        url=(http://host2/first?
                                v1=(http://host2/children?
                                        v1=(http://host3/aaa)
                                        )
                                )
                        title=(ccc)
                        )&
                v3=(http://host2/find-sub?
                        urls=(http://host2/rest?
                                v1=(http://host2/children?
                                        v1=(http://host3/aaa)
                                        )
                                )&
                        title=(ccc)
                        )
                )&
        v3=0
        )
```

Next, according to the message (55), procedure execution unit 110 requests of transmitter 106 to send the following message (56) to the receiver corresponding to "http://host2".

```
(56)
GET /if?
        v1=(http://host2/children?
                v1=(http://host3/aaa)
                )&
        v2=(http://host2/if?
                v1=(http://host2/find?
                        url=(http://host2/first
                                v1=(http://host2/children?
                                        v1=(http://host3/aaa)
                                        )
                                )&
                        title=(ccc))
                        )&
                v2=(http://host2/find?
                        url=(http://host2/first?
                                v1=(http://host2/children?
                                        v1=(http://host3/aaa)
                                        )
                                )
                        title=(ccc)
                        )&
                v3=(http://host2/find-sub?
                        urls=(http://host2/rest?
                                v1=(http://host2/children?
                                        v1=(http://host3/aaa)
                                        )
                                )&
                        title=(ccc)
                        )
                )&
        v3=0
        )
```

Transmitter 106 sends the message (56) to receiver 202, which corresponds to "http://host2". Receiver 202, which receives the message, inputs the message to message analyzer 204. Message analyzer 204 analyzes the message and requests of the remote procedure manager 210 to extract the procedure definition of the remote procedure container in which the value of attribute "name" is "if". Remote procedure manager 210 retrieves remote procedure container 211(1) and requests of procedure definition unit 2113(1) to output the procedure definition.

Remote procedure manager 210 requests of procedure execution unit via transmitter 203 and receiver 107 to execute the conditional branch algorithm under the following environment (57).

```
(57)    v1=(http://host2/children?
                v1=(http://host3/aaa)
                )
        v2=(http://host2/if?
                v1=(http://host2/find?
                        url=(http://host2/first
                                v1=(http://host2/children?
                                        v1=(http://host3/aaa)
                                        )
                                )&
                        title=(ccc))
                        )&
                v2=(http://host2/find?
                        url=(http://host2/first?
                                v1=(http://host2/chiidren?
                                        v1=(http://host3/aaa)
                                        )
                                )
                        title=(ccc))
                        )&
                v3=(http://host2/find-sub?
                        urls=(http://host2/rest?
                                v1=(http://host2/children?
                                        v1=(http://host3/aaa)
                                        )
                                )&
                        title=(ccc)
                        )
                )
        v3=0
```

Procedure execution unit 110 executes the conditional branch algorithm. Since the assignment to variable "v1" is a hyperlink, procedure execution unit 110 requests of transmitter 106 to send a message corresponding to the hyperlink. More in detail, procedure execution unit 110 requests of transmitter 106 to send message "GET/children?v1=(http://host3/aaa)" to the receiver identified by "http://host2". Transmitter 106 send the message to receiver 202.

Receiver 202, which receives the message, inputs the message to message analyzer 204. Message analyzer 204 analyzes the message and requests of remote procedure manager 210 to extract procedure definition stored in the remote procedure container in which the value of attribute "name" is "children". Remote procedure manager 210 retrieves remote procedure container 211(4) and requests of procedure definition unit 2113(4) to output the procedure definition. Procedure definition unit 2113(4) outputs the procedure definition that defines a reference extraction algorithm.

Remote procedure manager 210 requests of procedure execution unit 110 via transmitter 203 and receiver 107 to execute the reference extraction algorithm under environment "v1=(http://host3/aaa)". Procedure execution unit 110 executes the reference extraction algorithm and returns the following hypertext (58) as a reply to receiver 202.

(58)
<UL>
<LI><A HREF="http://host3/bbb">Reference1 </A>

<LI><A HREF="http://host3/ccc">Reference2 </A>
<LI><A HREF="http://host3/ddd">Reference3 </A>
</UL>

The reply is received by the procedure execution unit 110 that is executing the conditional branch algorithm. Procedure execution unit 110 analyzes the reply according to the conditional branch algorithm and gets the second assignment to "v1". Since the second assignment to "v1" is not "0", procedure execution unit 110 examines the assignment to "v2". Since the assignment to "v2" is the following expression (59), procedure execution unit 110 requests of transmitter 106 to send a message.

```
(59)    http://host2/if?
            v1=(http://host2/find?
                url=(http://host2/first
                    v1=(http://host2/children?
                        v1=(http://host3/aaa)
                    )
                )&
                title=(ccc))
            )&
            v2=(http://host2/find?
                url=(http://host2/first?
                    v1=(http://host2/children?
                        v1=(http://host3/aaa)
                    )
                )
                title=(ccc))
            )&
            v3=(http://host2/find-sub?
                urls=(http://host2/rest?
                    v1=(http://host2/children?
                        v1=(http://host3/aaa)
                    )
                )&
                title=(ccc)
            )
```

More in detail, procedure execution unit 110 requests of transmitter 106 to send the following message (60) to the receiver identified by "http://host2".

```
(60)    GET /if?
            v1=(http://host2/find?
                url=(http://host2/first
                    v1=(http://host2/children?
                        v1=(http://hosts/aaa)
                    )
                )&
                title=(ccc))
            )&
            v2=(http://host2/find?
                url=(http://host2/first?
                    v1=(http://host2/children?
                        v1=(http://host3/aaa)
                    )
                )
                title=(ccc))
            )&
            v3=(http://host2/find-sub?
                urls=(http://host2/rest?
                    v1=(http://host2/ohildren?
                        v1=(http://host3/aaa)
                    )
                )&
                title=(ccc)
            )
```

Transmitter 106 sends the message (60) to receiver 202. Message analyzer 204 analyzes the message and requests of remote procedure manager 210 to extract the procedure definition stored in the remote procedure container in which the value of attribute "name" is "if".

Remote procedure manager 210 retrieves remote procedure container 211(1) and requests of procedure definition unit 2113(1) to output the procedure definition. Procedure definition unit 2113(1) outputs the procedure definition that defines the conditional branch algorithm.

Remote procedure manager 210 requests of procedure execution unit 110 via transmitter 203 and receiver 107 to execute the conditional branch algorithm under the following environment (61).

```
(61)    v1=(http://host2/find?
            url=(http://host2/first?
                v1=(http://host2/children?
                    v1=(http://host3/aaa)
                )
            )&
            title=(ccc))
        )&
        v2=(http://host2/find?
            url=(http://host2/first?
                v1=(http://host2/children?
                    v1=(http://host3/aaa)
                )
            )
            title=(ccc))
        )&
        v3=(http://host2/find-sub?
            urls=(http://host2/rest?
                v1=(http://host2/children?
                    v1=(http://host3/aaa)
                )
            )&
            title=(ccc)
```

Procedure execution unit 110 examines the assignment to argument "v1". Since the assignment to "v1" is a message including a hyperlink, procedure execution unit 110 requests of transmitter 106 to send a message. More in detail, procedure execution unit 110 requests of transmitter 106 to send the following message (62) to the receiver identified by "http://host2".

```
(62)    GET /find?
            url=(http://host2/first?
                v1=(http://host2/children?
                    v1=(http://host3/aaa)
                )
            )&
            title=(ccc))
```

Transmitter 106 sends the message to receiver 202. Receiver 202, which receives the message, inputs the message to message analyzer 204. Message analyzer 204 analyzes the message and requests of remote procedure manager 210 to extract the procedure definition stored in the remote procedure container in which the value of attribute "name" is "find".

Remote procedure manager 210 retrieves remote procedure container **211(*a*) and requests of procedure definition unit 2113(*a*) to output the procedure definition. Remote procedure manager 210** gets the following procedure definition (63).

```
(63)
http://host2/if?
    v1=(http://host2/title-is?
```

-continued

```
        v1=(http://host2/first?
            v1=(http://host2/children?
                v1=(http://host3/aaa)
            )
        )&
        v2=(ccc)
    )&
    v2=(http://host2/first?
        v1=(http://host2/children?
            v1=(http://host3/aaa)
        )
    )&
    v3=(http://host2/find-sub?
        urls=(http://host2/children?
            v1=(http://host2/first?
                v1=(http://host2/children?
                    v1=(http://host3/aaa)
                )
            )
        )&
        title=(ccc)
    )
```

Details are not explained here for simplicity; however, procedure execution unit 110 gets a second assignment to "v1" from the first assignment to "v1" according to the conditional branch algorithm. Then, since the title of the page corresponding to the first reference included in the page identified by "http://host3/aaa" is not "ccc", a second assignment to "v3" is obtained from the first assignment to "v3".

Details are not explained here again for simplicity; however, procedure execution unit 110 executes the conditional branch algorithm called by the child page retrieval algorithm. Since the page identified by "http://host3/bbb" includes no reference, "0" is set to "v1" as a second assignment and "0" is returned.

Procedure execution unit 110 that is executing the conditional branch algorithm receives the reply, and a second assignment to "v3" is obtained from the first assignment to "v3" shown in the following.

```
(64)    http://host2/find-sub?
            urls=(http://host2/rest?
                v1=(http://host2/children?
                    v1=(http://host3/aaa)
                )
            )&
            title=(ccc)
```

Then, the following expression (65) is executed according to the list transformation algorithm.

```
(65)
http://host2/if?
    v1=(http://host2/rest?
        v1=(http://host2/children?
            v1=(http://host3/aaa)
        )
    )&
    v2=(http://host2/if?
        v1=(http://host2/find?
            url=(http://host2/first?
                v1=(http://host2/rest?
                    v1=(http://host2/children?
                        v1=(http://host3/aaa)
                    )
```

-continued

```
                )
            )&
            title=(ccc)
        )
    )&
    v2=(http://host2/find?
        url=(http://host2/first?
            v1=(http://host2/rest?
                v1=(http://host2/children?
                    v1=(http://host3/aaa)
                )
            )
        )&
        title=(ccc)
    )&
    v3=(http://host2/find-sub?
        urls=(http://host2/rest?
            v1=(http://host2/rest?
                v1=(http://host2/children?
                    v1=(http://host3/aaa)
                )
            )
        )&
        title=(ccc)
    )
    v3=0
```

Details are not explained here for simplicity; however, since the second assignment to "v1" is not "0", a message is sent from transmitter 106 to get a second assignment to "v2".

Again, details are not explained here for simplicity; however, then the title of the second reference included in the page "http://host3/aaa" is "ccc", contents of the page is sent as a reply from transmitter 106 to receiver 107.

As described above, according to this configuration, the user can define a procedure easily by using a template of procedure definition and execute the defined procedure on a client.

[Third Embodiment]

FIG. 5 is a block diagram that shows a configuration of the third embodiment. In this embodiment, each of remote procedure client 100 and remote procedure server 200 has procedure execution unit 110 and 212. Since the other configuration is the same as that of the first or second embodiment, the same number is given to the corresponding unit and details are not explained here.

All explanation of the embodiments of the present invention is finished here.

This invention is not limited to the embodiments described above. It is possible to change the embodiments as far as it does not deviate the points. For example, defining of a function (procedure) having parameters is explained in the embodiments described above; however it is possible to define a function (procedure) that does not have parameters, such as a function (procedure) with no argument giving an alias to a composite function. Further, when a function having parameters is defined, it is possible to provide a specialized function that is to execute assignment to the parameters. In this case, the function of assignment can execute the real replacement of variables with values or determine the value by referring to the environment when variables are evaluated. It is also possible to use a syntax of variable declarations which specifies variable names and their scope. Furthermore, it is possible to use a notation indicating variables, which is common notation to all functions.

In the above described embodiments, a method that creates a hypertext is used. Plural pages including empty slots are exported as primitive functions, and a desired hypertext is created by connecting the pages as components. The created graph structure (pages connected each other) is the desired program. In this case, a binding which a slot is filled with a value can be stored persistently as an instance created from a page of template.

As described above, by using this invention, the user can interactively connect remote procedures that are located on networks in distribution so as to call a composite remote procedure or to define a new remote procedure.

What is claimed is:

1. A procedure execution device comprising:
   a client including:
      an input unit that inputs a first query to retrieve a program and a parameter for executing the program; and
      a first transmitter that transmits the first query and the parameter to a communication network; and
   a server connected with the client by the communication network, the server including:
      a receiver that receives the first query and the parameter from the first transmitter;
      a message analyzer that separates the first query and the parameter;
      a memory that stores a procedure and a slot, both being corresponded to the first query;
      a procedure retriever that retrieves the procedure and the slot corresponding to the first query; and
      a second transmitter that transmits the procedure for retrieving a program and the slot in which the parameter separated by the message analyzer is inserted.

2. A computer program that controls a computer, comprising:
   a storage medium that is readable through an input unit of the computer;
   an input command stored in the storage medium for causing the computer to input a first query to retrieve a program and a parameter for executing the program;
   a message analyzing command stored in the storage medium for causing the computer to separate the first query and the parameter;
   a reading command stored in the storage medium for causing the computer to read data that includes a procedure and a slot, both being corresponded with the first query;
   a procedure retrieval command stored in the storage medium for causing the computer to retrieve the procedure and the slot corresponding to the first query;
   a procedure control command stored in the storage medium for causing the computer to invoke the procedure to retrieve the program and to insert the parameter in the slot.

3. The procedure execution device of claim 1, wherein the second transmitter transmits the procedure as the first query inputted through the input unit of the client and the slot in which the parameter separated by the message analyzer is inserted as the parameter inputted through the input unit of the client.

* * * * *